United States Patent
Asano et al.

(10) Patent No.: US 10,075,607 B2
(45) Date of Patent: Sep. 11, 2018

(54) READING APPARATUS, READING METHOD, AND READING PROGRAM

(71) Applicant: Konica Minolta, Inc., Tokyo (JP)

(72) Inventors: Hitoshi Asano, Toyokawa (JP);
Katsuhide Sakai, Toyokawa (JP);
Tomonobu Tamura, Toyokawa (JP);
Harumitsu Fujimori, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/444,433

(22) Filed: Feb. 28, 2017

(65) Prior Publication Data

US 2017/0272599 A1 Sep. 21, 2017

(30) Foreign Application Priority Data

Mar. 18, 2016 (JP) .................. 2016-055773

(51) Int. Cl.
*H04N 1/04* (2006.01)
*H04N 1/031* (2006.01)
*H04N 1/028* (2006.01)
*H04N 1/03* (2006.01)

(52) U.S. Cl.
CPC ......... *H04N 1/0318* (2013.01); *H04N 1/0285* (2013.01); *H04N 1/02865* (2013.01); *H04N 1/02895* (2013.01); *H04N 1/0306* (2013.01); *H04N 2201/0081* (2013.01); *H04N 2201/02487* (2013.01); *H04N 2201/02493* (2013.01); *H04N 2201/02497* (2013.01)

(58) Field of Classification Search
CPC ............... H04N 1/0318; H04N 1/0285; H04N 1/02865; H04N 1/02895

USPC .................................................. 358/518, 509
See application file for complete search history.

(56) References Cited

U.S. PATENT DOCUMENTS

| | | | | |
|---|---|---|---|---|
| 2011/0096375 A1* | 4/2011 | Mikami | ............ | H04N 1/00002 358/475 |
| 2014/0077101 A1* | 3/2014 | Ohama | ............ | G07D 7/121 250/461.1 |
| 2014/0197443 A1* | 7/2014 | Moon | ............ | H01L 33/507 257/98 |

FOREIGN PATENT DOCUMENTS

| | | |
|---|---|---|
| JP | 2008028617 A | 2/2008 |
| JP | 2011109625 A | 6/2011 |
| JP | 2013229704 A | 11/2013 |

* cited by examiner

*Primary Examiner* — Houshang Safaipour
(74) *Attorney, Agent, or Firm* — Lucas & Mercanti, LLP

(57) ABSTRACT

A reading apparatus that reads a sheet includes: a first light emitting diode (LED) configured to emit light with a specific wavelength; a light emitting element including a second LED configured to emit light with the specific wavelength and a phosphor configured to be excited by the light emitted from the second LED; a line sensor configured to generate a reference signal according to a quantity of received light emitted from the first LED and reflected off the sheet, and also generate an image signal according to a quantity of received light emitted from the light emitting element and reflected off the sheet; and a controller configured to generate an image representing the sheet from a differential result obtained by removing a component corresponding to the reference signal from the image signal.

14 Claims, 13 Drawing Sheets

READING APPARATUS, READING METHOD, AND READING PROGRAM

The entire disclosure of Japanese Patent Application No. 2016-055773 filed on Mar. 18, 2016 including description, claims, drawings, and abstract are incorporated herein by reference in its entirety.

BACKGROUND OF THE INVENTION

Field of the Invention

The present disclosure relates to a reading apparatus that reads a sheet. Particularly, the present disclosure relates to a technique that allows a sheet to be read with high accuracy.

Description of the Related Art

Reading apparatuses such as scanners have been widely used. A reading apparatus includes a line sensor, and reads a sheet using the line sensor. There are two line sensor-based reading methods: one method uses three line sensors to read a sheet (hereinafter, referred to as a "first reading method"); and the other method uses one line sensor to read a sheet (hereinafter, referred to as a "second reading method").

The following describes the first reading method. A color filter that transmits red light is provided in a first line sensor among the three line sensors. A color filter that transmits green light is provided in a second line sensor. A color filter that transmits blue light is provided in a third line sensor. A reading apparatus includes a white light source, and the white light source irradiates a sheet with white light. Light reflected off the sheet enters the first to third line sensors. The first line sensor receives the light that has been transmitted through the color filter, and then generates an image representing red components of the sheet. The second line sensor receives the light that has been transmitted through the color filter, and then generates an image representing green components of the sheet. The third line sensor receives the light that has been transmitted through the color filter, and then generates an image representing blue components of the sheet. The reading apparatus then generates a color image by combining the images of the respective colors.

JP 2008-028617 A (Patent Document 1), JP 2013-229704 A (Patent Document 2), and JP 2011-109625 A (Patent Document 3) disclose techniques that apply the first reading method.

The following describes the second reading method. In a reading apparatus adopting the second reading method, a light emitting diode (LED) that emits red light, an LED that emits green light, and an LED that emits blue light are provided. The reading apparatus consecutively switches over the light emission timing of each LED, causing light of each LED to be emitted to a sheet to be read. A line sensor receives the red light reflected off the sheet, and generates an image representing red components of the sheet. The line sensor receives the green light reflected off the sheet, and generates an image representing green components of the sheet. The line sensor receives the blue light reflected off the sheet, and generates an image representing blue components of the sheet. The reading apparatus then generates a color image by combining the images of the respective colors.

Generally, a charge-coupled device (CCD) is adopted as a line sensor in the first reading method. In the second reading method, a contact image sensor (CIS) is adopted as a line sensor. Since the CCD is more expensive than the CIS, the second reading method can be implemented with lower costs than the first reading method.

On the other hand, the reading accuracy of the first reading method is higher than that of the second reading method. One of the reasons is a difference in illumination light. Light of a white LED that the first reading method adopts has a spectral distribution ranging over a visible region from purple to red. By contrast, in the second reading method, an LED of each color emits red light, green light, and blue light. Therefore, these LEDs have a few wavelength components other than their respective red, green, and blue wavelength components. As a result, the color reproducibility of the second reading method is lower than that of the first reading method.

Accordingly, it is desired that a reading apparatus have both advantages: the cost advantage of the first reading method and the advantage of the reading accuracy of the second reading method.

SUMMARY OF THE INVENTION

The present disclosure has been made to solve the issue as described above. An object of one aspect is to provide a reading apparatus that allows a sheet to be read with high accuracy using an inexpensive line sensor. An object of another aspect is to provide a reading method that allows a sheet to be read with high accuracy using an inexpensive line sensor. An object of still another aspect is to provide a reading program that allows a sheet to be read with high accuracy using an inexpensive line sensor.

To achieve at least one of the abovementioned objects, according to an aspect, a reading apparatus that reads a sheet reflecting one aspect of the present invention comprises: a first light emitting diode (LED) configured to emit light with a specific wavelength; a light emitting element including a second LED configured to emit light with the specific wavelength and a phosphor configured to be excited by the light emitted from the second LED; a line sensor configured to generate a reference signal according to a quantity of received light emitted from the first LED and reflected off the sheet, and also generate an image signal according to a quantity of received light emitted from the light emitting element and reflected off the sheet; and a controller configured to generate an image representing the sheet from a differential result obtained by removing a component corresponding to the reference signal from the image signal.

The first LED and the second LED preferably emit ultraviolet light. The reading apparatus preferably includes the at least three light emitting elements. Among the at least three light emitting elements, a first light emitting element preferably includes a red phosphor, as the phosphor, configured to emit red light by being excited by the ultraviolet light emitted from the second LED. Among the at least three light emitting elements, a second light emitting element preferably includes a green phosphor, as the phosphor, configured to emit green light by being excited by the ultraviolet light emitted from the second LED. Among the at least three light emitting elements, a third light emitting element preferably includes a blue phosphor, as the phosphor, configured to emit blue light by being excited by the ultraviolet light emitted from the second LED. The line sensor preferably generates: the reference signal according to a quantity of received ultraviolet light emitted from the first LED and reflected off the sheet; a first image signal as the image signal according to a quantity of received red light emitted from the first light emitting element and reflected off the sheet; a second image signal as the image signal according to a quantity of received green light emitted from the second light emitting element and reflected off the sheet; and a third image signal as the image signal according to a quantity of received blue light emitted from the third light emitting element and reflected off the sheet. The controller preferably generates the image by combining a differential result obtained by removing a component corresponding to the reference signal from the first image signal, a differential result obtained by removing a component corresponding to the reference signal from the second image signal, and a differential result obtained by removing a component corresponding to the reference signal from the third image signal.

The controller preferably subtracts the reference signal from the image signal after attenuating the reference signal by a predetermined factor, or amplifying the image signal by a predetermined factor.

The controller preferably changes an attenuation factor of the reference signal or an amplification factor of the image signal according to at least one of a total light emission time of the first LED up to a present time and a total light emission time of the light emitting element up to a present time.

The reading apparatus preferably further comprises a temperature sensor configured to detect an ambient temperature of the first LED or the light emitting element. The controller preferably changes an attenuation factor of the reference signal or an amplification factor of the image signal.

The reading apparatus preferably further comprises a white plate. The controller preferably controls light emissions of the first LED and the second LED such that a level of a signal to be output by the line sensor receiving light emitted from the first LED and reflected off the white plate and a level of a signal to be output by the line sensor receiving light emitted from the light emitting element and reflected off the white plate become equal to each other.

A paint for reflecting ultraviolet light is preferably applied to a portion of the white plate. The controller preferably controls light emissions of the first LED and the second LED such that a level of a signal to be output by the line sensor receiving light emitted from the first LED and reflected off the paint and a level of a signal to be output by the line sensor receiving light emitted from the light emitting element and reflected off the paint become equal to each other.

The reading apparatus preferably further comprises a reflection plate configured to reflect ultraviolet light. The controller preferably controls light emissions of the first LED and the second LED such that a level of a signal to be output by the line sensor receiving light emitted from the first LED and reflected off the reflection plate and a level of a signal to be output by the line sensor receiving light emitted from the light emitting element and reflected off the reflection plate become equal to each other.

The first LED and the second LED preferably emit blue light. The reading apparatus preferably includes the at least two light emitting elements. Among the at least two light emitting elements, a first light emitting element preferably includes a red phosphor, as the phosphor, configured to emit red light by being excited by the blue light emitted from the second LED. Among the at least two light emitting elements, a second light emitting element preferably includes a green phosphor, as the phosphor, configured to emit green light by being excited by the blue light emitted from the second LED. The line sensor preferably generates: the reference signal according to a quantity of received blue light emitted from the first LED and reflected off the sheet; a first image signal as the image signal according to a quantity of received red light emitted from the first light emitting element and reflected off the sheet; and a second image signal as the image signal according to a quantity of received green light emitted from the second light emitting element and reflected off the sheet. The controller preferably generates the image by combining the reference signal, a differential result obtained by removing a component corresponding to the reference signal from the first image signal, and a differential result obtained by removing a component corresponding to the reference signal from the second image signal.

The reading apparatus preferably further comprises a reflection plate configured to reflect blue light. The controller preferably controls light emissions of the first LED and the second LED such that a level of a signal to be output by the line sensor receiving light emitted from the first LED and reflected off the reflection plate and a level of a signal to be output by the line sensor receiving light emitted from the light emitting element and reflected off the reflection plate become equal to each other.

To achieve at least one of the abovementioned objects, according to an aspect, a reading method that reads a sheet reflecting one aspect of the present invention comprises: causing a first LED to emit light with a specific wavelength; generating a reference signal according to a quantity of received light emitted from the first LED and reflected off the sheet; causing a light emitting element to emit light, the light emitting element including a second LED configured to emit light with the specific wavelength and a phosphor configured to be excited by the light emitted from the second LED; generating an image signal according to a quantity of received light emitted from the light emitting element and reflected off the sheet; and generating an image representing the sheet from a differential result obtained by removing a component corresponding to the reference signal from the image signal.

To achieve at least one of the abovementioned objects, according to an aspect, there is provided a non-transitory recording medium storing a computer readable program that reads a sheet, and the program reflecting one aspect of the present invention causes a computer to execute: causing a first LED to emit light with a specific wavelength; generating a reference signal according to a quantity of received light emitted from the first LED and reflected off the sheet; causing a light emitting element to emit light, the light emitting element including a second LED configured to emit light with the specific wavelength and a phosphor configured to be excited by the light emitted from the second LED; generating an image signal according to a quantity of received light emitted from the light emitting element and reflected off the sheet; and generating an image representing the sheet from a differential result obtained by removing a component corresponding to the reference signal from the image signal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of the present invention will be described with reference to the drawings. However, the scope of the invention is not limited to the illustrated examples. In the following description, the identical components and constituent elements are denoted with the identical reference signs. The names and functions thereof are also identical. Therefore, the detailed descriptions thereof will not be repeated. The embodiments and modifications described below may be selectively combined appropriately.

First Embodiment

[Structure of Reading Apparatus 100]

Figure 1:
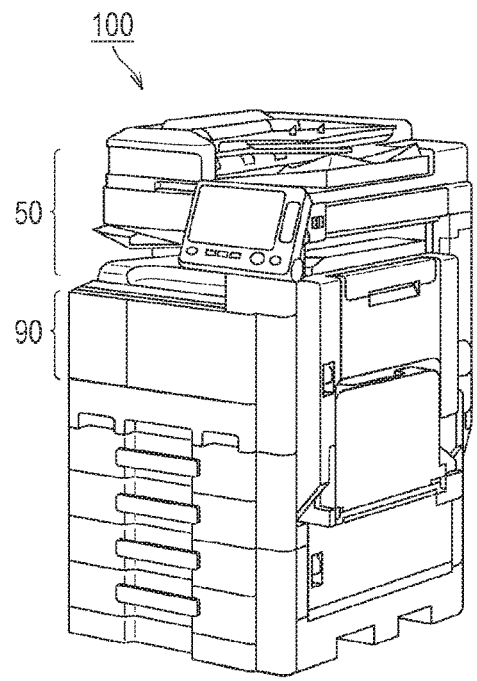
FIG. 1 is a view illustrating an external appearance of a reading apparatus according to a first embodiment.

The following describes a reading apparatus 100 according to the first embodiment with reference to FIG. 1. FIG. 1 is a view illustrating an external appearance of the reading apparatus 100.

In FIG. 1, the reading apparatus 100 as a multi-functional peripheral (MFP) is illustrated. The following description is as to the reading apparatus 100 serving as an MFP. However, the reading apparatus 100 is not limited to an MFP. For example, the reading apparatus 100 may be a scanner, a facsimile (FAX), or any other image forming apparatus.

The reading apparatus 100 includes a scanner 50 and a printer 90. The scanner 50 reads a sheet that has been set, and generates an image representing the sheet. The printer 90 prints the sheet or the like that has been read by the scanner 50 as an image using an electrophotographic method or the like.

[Structure of Scanner 50]

Figure 2:
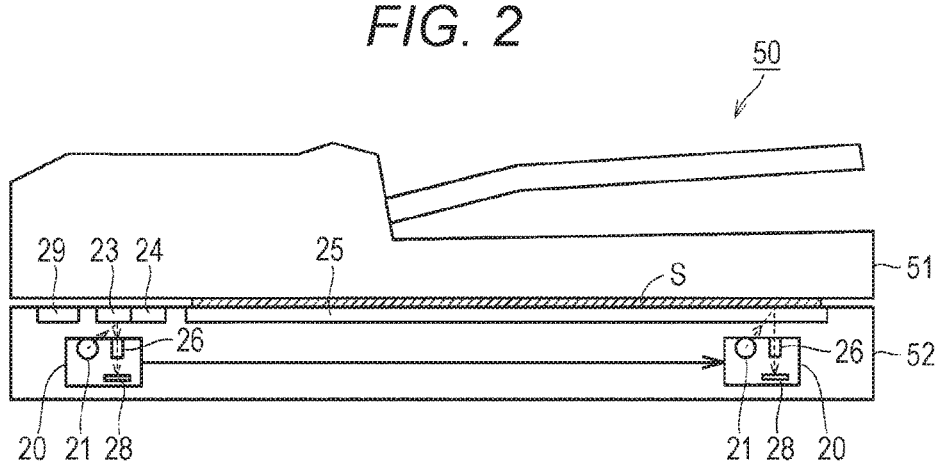
FIG. 2 is a cross-sectional view of a scanner according to the first embodiment.
Figure 3:
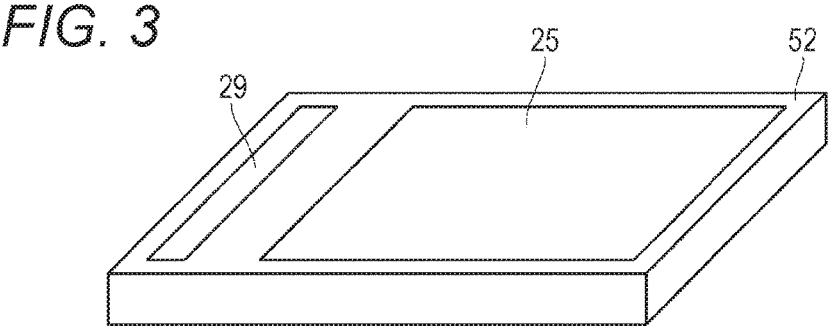
FIG. 3 is a view illustrating a sheet table of the scanner according to the first embodiment.
Figure 4:
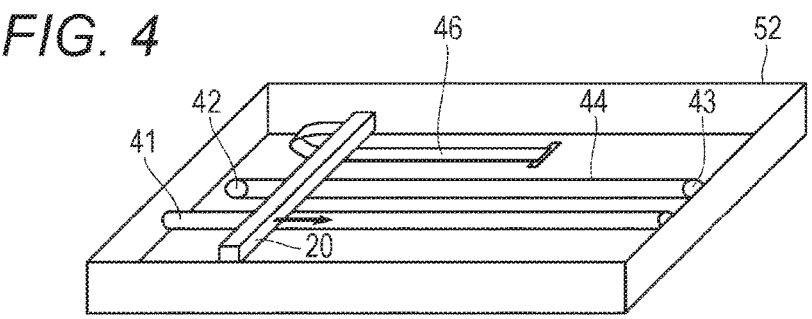
FIG. 4 is a view illustrating an internal structure of the sheet table according to the first embodiment.
Figure 5:
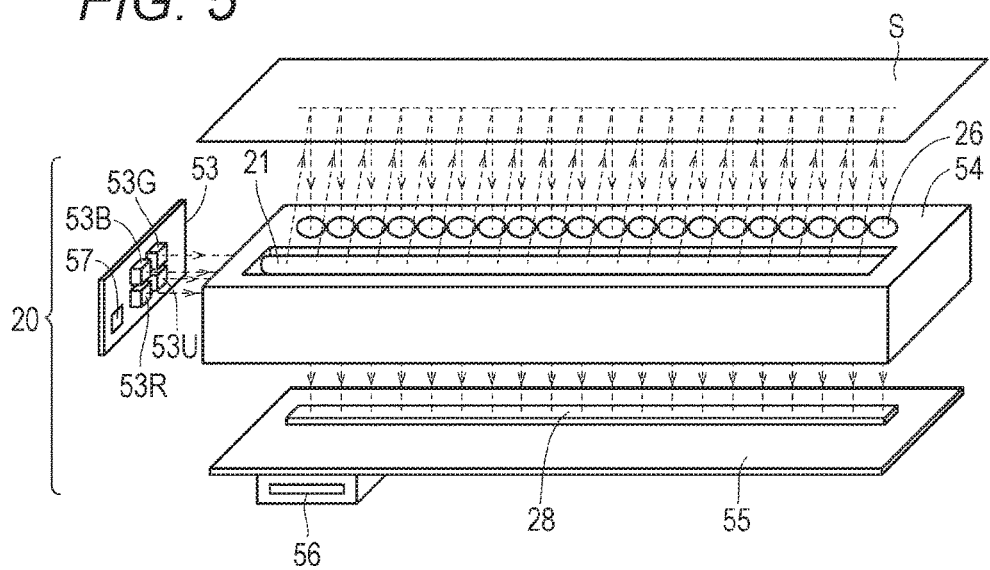
FIG. 5 is a view illustrating a structure of a CIS unit included in the scanner according to the first embodiment.

The following describes the scanner 50 illustrated in FIG. 1 with reference to FIGS. 2 to 5. FIG. 2 is a cross-sectional view of the scanner 50. FIG. 3 is a view illustrating a sheet table 52 of the scanner 50. FIG. 4 is a view illustrating an internal structure of the sheet table 52. FIG. 5 is a view illustrating a structure of a CIS unit 20 included in the scanner 50.

As illustrated in FIGS. 2 and 3, the scanner 50 includes a cover 51 and the sheet table 52. The cover 51 is fixed at one end of the sheet table 52, and can be opened and closed with the end as a fulcrum. A user of the reading apparatus 100 can open the cover 51, after which the user can set a sheet S on the sheet table 52. When the cover 51 is closed with the sheet S set, external light does not enter the scanner 50.

The sheet table 52 includes the CIS unit 20, a white plate 23, a purple plate 24, and glass windows 25 and 29. The CIS unit 20 is driven below the white plate 23, the purple plate 24, and the glass window 25. The CIS unit 20 can read the sheet S set on the glass window 25 while moving.

As illustrated in FIG. 4, the sheet table 52 includes the CIS unit 20, a sliding mechanism 41, a gear 42, a pulley 43, a belt 44, and a flexible flat cable (FFC) 46.

The belt 44 is tightly extended between the gear 42 and the pulley 43. The gear 42 is connected to a motor (not illustrated). When the motor is driven, the gear 42 rotates. The driving force of the gear 42 is transmitted to the belt 44. The CIS unit 20 is held by the sliding mechanism 41. The CIS unit 20 slides along the longitudinal direction of the sliding mechanism 41 in accordance with the rotation of the belt 44.

As illustrated in FIG. 5, the CIS unit 20 includes circuit substrates 53 and 55 and a housing 54. In the circuit substrate 53, an LED 53U, light emitting elements 53R, 53G, and 53B, and a temperature sensor 57 are provided. In the housing 54, a light guide 21 and a lens array 26 are provided. In the circuit substrate 55, a line sensor 28 and a connector 56 to which the FFC 46 is connected are provided.

The LED 53U (first LED) emits ultraviolet light. The ultraviolet light is light in an invisible region and has a wavelength of 400 nm or less. The ultraviolet light emitted from the LED 53U enters and travels through the light guide 21, and strikes the sheet S. After the ultraviolet light is reflected off the sheet S and passes through the lens array 26, the ultraviolet light enters the line sensor 28.

The light emitting element 53R includes an LED (second LED) and a red phosphor. The LED (second LED) emits light with a specific wavelength. The red phosphor emits red light as a result of being excited by the light emitted from the LED. As an example, the LED emits ultraviolet light having a wavelength of 400 nm or less. The red phosphor absorbs the ultraviolet light as excitation light and emits red light having a longer wavelength (e.g., 620 nm to 750 nm) than the ultraviolet light. The red light emitted from the light emitting element 53R enters and travels through the light guide 21, and strikes the sheet S. After the red light is reflected off the sheet S and passes through the lens array 26, the red light enters the line sensor 28.

The light emitting element 53G includes an LED (second LED) and a green phosphor. The LED (second LED) emits light with a specific wavelength. The green phosphor emits green light as a result of being excited by the light emitted from the LED. As an example, the LED emits ultraviolet light having a wavelength of 400 nm or less. The green phosphor absorbs the ultraviolet light as excitation light and emits green light having a longer wavelength (e.g., 495 nm to 570 nm) than the ultraviolet light. The green light emitted from the light emitting element 53G enters and travels through the light guide 21, and strikes the sheet S. After the green light is reflected off the sheet S and passes through the lens array 26, the green light enters the line sensor 28.

The light emitting element 53B includes an LED (second LED) and a blue phosphor. The LED (second LED) emits light with a specific wavelength. The blue phosphor emits blue light as a result of being excited by the light emitted from the LED. As an example, the LED emits ultraviolet light having a wavelength of 400 nm or less. The blue phosphor absorbs the ultraviolet light as excitation light and emits blue light having a longer wavelength (e.g., 450 nm to 495 nm) than the ultraviolet light. The blue light emitted from the light emitting element 53B enters and travels through the light guide 21, and strikes the sheet S. After the blue light is reflected off the sheet S and passes through the lens array 26, the blue light enters the line sensor 28.

The line sensor 28 includes, for example, a plurality of imaging elements. Each imaging element is, for example, a complementary metal-oxide semiconductor (CMOS). Each imaging element is arranged in a row so as to be orthogonal to the direction in which the CIS unit 20 is driven. The CIS unit 20 receives light reflected off the sheet S while being driven. Then, each imaging element of the CIS unit 20 photoelectrically converts the light reflected off the sheet S, and outputs an electrical signal according to the quantity of reflected light. The electrical signal is then output through the FFC 46 to a controller 101 (refer to FIG. 14) that will be described later. The controller 101 quantifies, as a pixel value, the magnitude of each electrical signal received from each imaging element, and arranges the pixel values for each imaging element in chronological order. In this way, an image representing the sheet S is generated.

Preferably, a color filter for cutting light with a specific wavelength is not provided in the line sensor 28. By not providing the color filter, the cost of the line sensor 28 is reduced.

In the example described above, the CIS unit 20 is caused to move to read the sheet S. Alternatively, an object to be moved while the sheet S is being read may be the sheet S, instead of the CIS unit 20. The sheet S is, for example, conveyed by an auto document feeder (ADF) (not illustrated). The ADF is an apparatus that automatically conveys the sheets S set on the reading apparatus 100 one by one to the inside of the reading apparatus 100.

When the reading apparatus 100 receives an instruction to read the sheet S using the ADF, the reading apparatus 100 causes the CIS unit 20 to move below the glass window 29. Subsequently, the ADF starts conveying the sheet S. The ADF conveys the sheet S such that the sheet S passes over the glass window 29. The CIS unit 20 reads the sheet S passing over the glass window 29.

[Light Emission Characteristics]

Figure 6:
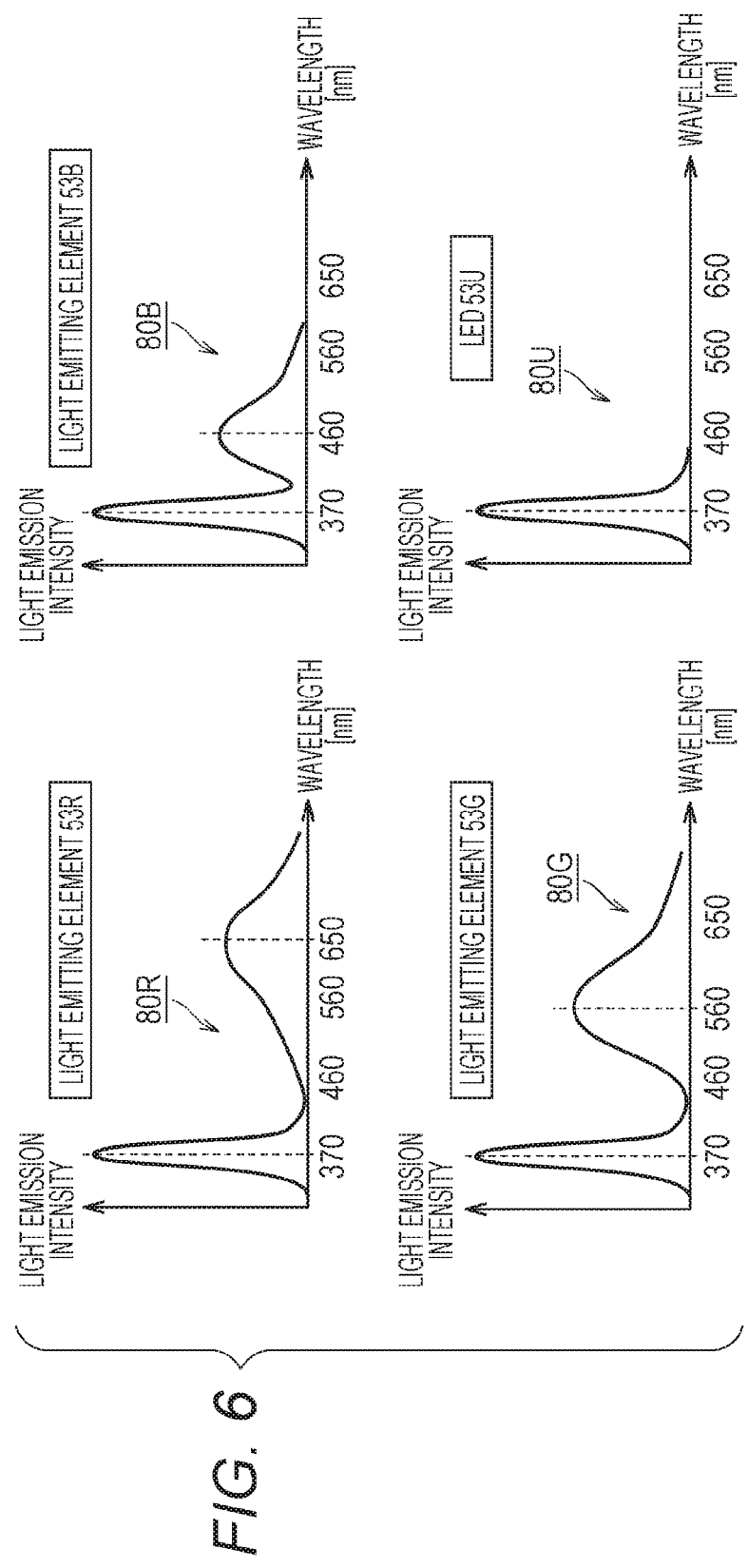
FIG. 6 is a set of graphs illustrating light emission characteristics of light emitting elements of respective colors and a light emission characteristic of an LED.

The following describes the light emission characteristics of the light emitting elements 53R, 53G, and 53B and the LED 53U illustrated in FIG. 5, with reference to FIG. 6. FIG. 6 is a set of graphs illustrating the light emission characteristics of the light emitting elements 53R, 53G, and 53B and the light emission characteristic of the LED 53U.

In FIG. 6, graphs 80R, 80G, 80B, and 80U are illustrated. The light emission characteristic of the light emitting element 53R is illustrated in the graph 80R. As described above, the light emitting element 53R includes the LED that emits ultraviolet light and the red phosphor. Hereinafter, an LED that emits ultraviolet light will be referred to as a "UV-LED". The UV-LED excites the red phosphor by emitting, to the red phosphor, ultraviolet light having a wavelength of approximately 370 nm. In response, the red phosphor emits red light having a wavelength of approximately 650 nm. Since the red phosphor is excited by the ultraviolet light, the light emission intensities of the red light and ultraviolet light are higher than those of other colors in the light emitting element 53R.

The light emission characteristic of the light emitting element 53G is illustrated in the graph 80G. As described above, the light emitting element 53G includes the UV-LED and the green phosphor. The UV-LED excites the green phosphor by emitting, to the green phosphor, ultraviolet light having a wavelength of approximately 370 nm. In response, the green phosphor emits green light having a wavelength of approximately 560 nm. Since the green phosphor is excited by the ultraviolet light, the light emission intensities of the green light and ultraviolet light are higher than those of other colors in the light emitting element 53G.

The light emission characteristic of the light emitting element 53B is illustrated in the graph 80B. As described above, the light emitting element 53B includes the UV-LED and the blue phosphor. The UV-LED excites the blue phosphor by emitting, to the blue phosphor, ultraviolet light having a wavelength of approximately 370 nm. In response, the blue phosphor emits blue light having a wavelength of approximately 460 nm. Since the blue phosphor is excited by the ultraviolet light, the light emission intensities of the blue light and ultraviolet light are higher than those of other colors in the light emitting element 53B.

The light emission characteristic of the LED 53U is illustrated in the graph 80U. As described above, the LED 53U is a UV-LED and emits ultraviolet light. Therefore, the light emission intensity of the ultraviolet light is higher than those of other colors in the LED 53U.

[Method of Generating Image Signals]

Figure 7:
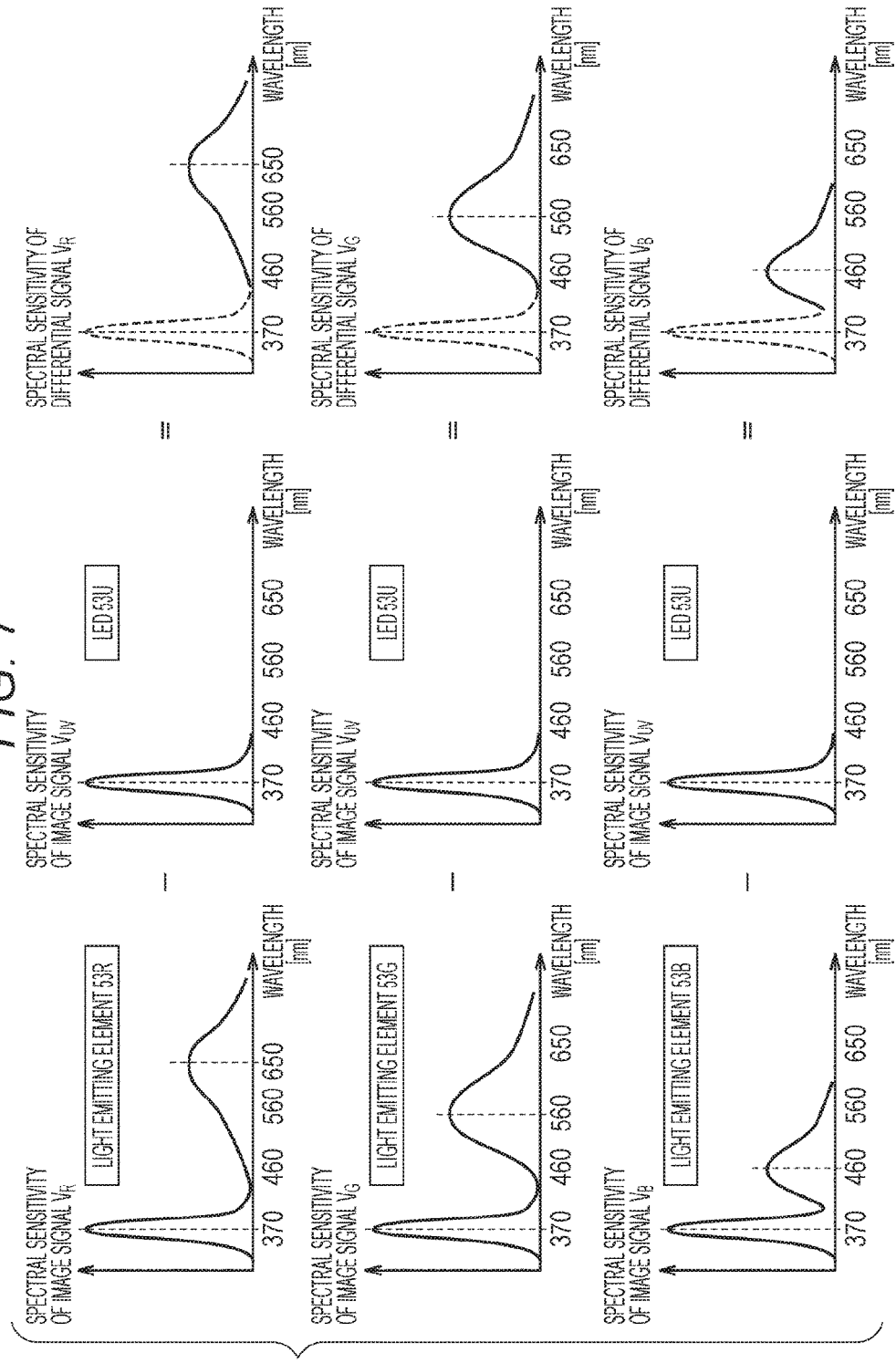
FIG. 7 is a set of conceptual graphs schematically illustrating methods of generating image signals.

The following describes a method of generating image signals in the reading apparatus 100 with reference to FIG. 7. FIG. 7 is a set of conceptual graphs schematically illustrating methods of generating the image signals.

As described above, the light emitting element 53R emits red light as a result of being excited by ultraviolet light. Consequently, unnecessary ultraviolet light is included in the light emitted from the light emitting element 53R. Since the line sensor 28 (refer to FIG. 2) performs photoelectric conversion according to the quantity of light including both red light and ultraviolet light, the quantity of ultraviolet light is also reflected in an image signal. As a result, the reading apparatus 100 needs to remove ultraviolet components in order to just read red components from a sheet. Therefore, from an image signal that the line sensor 28 generates as a result of the light emission of the light emitting element 53R, the reading apparatus 100 subtracts components corresponding to an image signal that the line sensor 28 generates as a result of the light emission of the LED 53U emitting ultraviolet light. In this way, the reading apparatus 100 removes the ultraviolet components.

More specifically, the reading apparatus 100 causes the LED 53U to emit light. Subsequently, the line sensor 28 receives the ultraviolet light emitted from the LED 53U and reflected off the sheet. The line sensor 28 then generates an image signal $V_{UV}$ (reference signal) according to the quantity of received light.

Subsequently, the reading apparatus 100 causes the light emitting element 53R to emit light. The line sensor 28 receives the red light emitted from the light emitting element 53R and reflected off the sheet. The line sensor 28 then generates an image signal $V_R$ (first image signal) according to the quantity of received light. The controller 101 (refer to FIG. 14) of the reading apparatus 100 subtracts the image signal $V_{uv}$ from the image signal $V_R$. The controller 101 then outputs a differential signal $V_R$ as a result of the subtraction. In this way, the ultraviolet components are removed from the image signal $V_R$.

Subsequently, the reading apparatus 100 causes the light emitting element 53G to emit light. The line sensor 28 receives the green light emitted from the light emitting element 53G and reflected off the sheet. The line sensor 28 then generates an image signal $V_G$ (second image signal) according to the quantity of received light. The controller 101 subtracts the image signal $V_{UV}$ from the image signal $V_G$. The controller 101 then outputs a differential signal $V_G$ as a result of the subtraction. In this way, the ultraviolet components are removed from the image signal $V_G$.

Subsequently, the reading apparatus 100 causes the light emitting element 53B to emit light. The line sensor 28 receives the blue light emitted from the light emitting element 53B and reflected off the sheet. The line sensor 28 then generates an image signal $V_B$ (third image signal) according to the quantity of received light. The controller 101 subtracts the image signal $V_{uv}$ from the image signal $V_B$. The controller 101 then outputs a differential signal $V_B$ as a result of the subtraction. In this way, the ultraviolet components are removed from the image signal $V_B$.

The controller 101 generates a color image representing the sheet by combining the differential signal $V_R$(differential result), the differential signal $V_G$(differential result), and the differential signal $V_B$(differential result). The differential signal $V_R$ is obtained by subtracting the image signal $V_{UV}$ from the image signal $V_R$. The differential signal $V_G$ is obtained by subtracting the image signal $V_{UV}$ from the image signal $V_G$. The differential signal $V_B$ is obtained by subtracting the image signal $V_{UV}$ from the image signal $V_B$. In this way, the controller 101 generates a color image after removing unnecessary ultraviolet components from the image signals $V_R$, $V_G$, and $V_B$. Therefore, a color image having high color reproducibility can be generated.

Note that although the LED 53U and the three light emitting elements 53R, 53G, and 53B are used to generate an image in the examples illustrated in FIG. 7, the number of light emitting elements is not limited to three. The reading apparatus 100 just needs to include at least one light emitting element. As an example, the reading apparatus 100 includes one light emitting element and a UV-LED (first LED). The UV-LED emits ultraviolet light with a specific wavelength. The light emitting element includes a UV-LED (second LED) and a phosphor. The UV-LED (second LED) emits ultraviolet light with a specific wavelength. The phosphor is excited by the ultraviolet light emitted from the UV-LED. The line sensor 28 receives the light emitted from the first LED and reflected off the sheet, and then generates an image signal $V_{UV}$ (reference signal) according to the quantity of received light. The line sensor 28 also receives the light emitted from the light emitting element and reflected off the sheet, and then generates an image signal V according to the quantity of received light. The controller 101 subtracts the image signal $V_{uv}$ from the image signal V. The controller 101 then generates an image representing the sheet from the result of the subtraction.

In this way, the unnecessary ultraviolet components are removed, and thus the reading accuracy of the reading apparatus 100 is improved accordingly. In addition, the spectrum of light emitted from a phosphor is distributed more widely than the spectrum of light emitted from an LED. By generating an image from the light of the phosphor, therefore, the color reproducibility is more improved. Furthermore, the line sensor 28 included in the reading apparatus 100 is of an inexpensive type that is not provided with a color filter. Therefore, the cost of the reading apparatus 100 can be reduced. Furthermore, there can be just one line sensor 28 included in the reading apparatus 100. Therefore, the cost for the line sensor 28 can be reduced.

[Method of Controlling CIS Unit 20]

Figure 8:
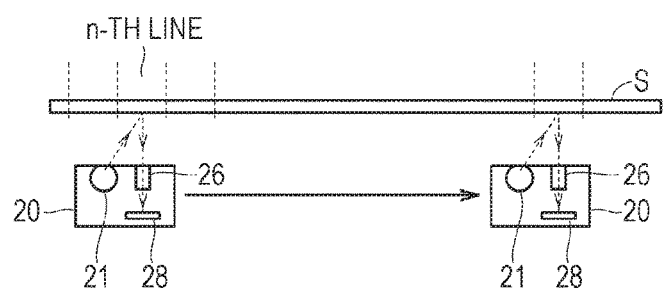
FIG. 8 is a diagram illustrating the CIS unit moving with respect to a sheet.
Figure 9:
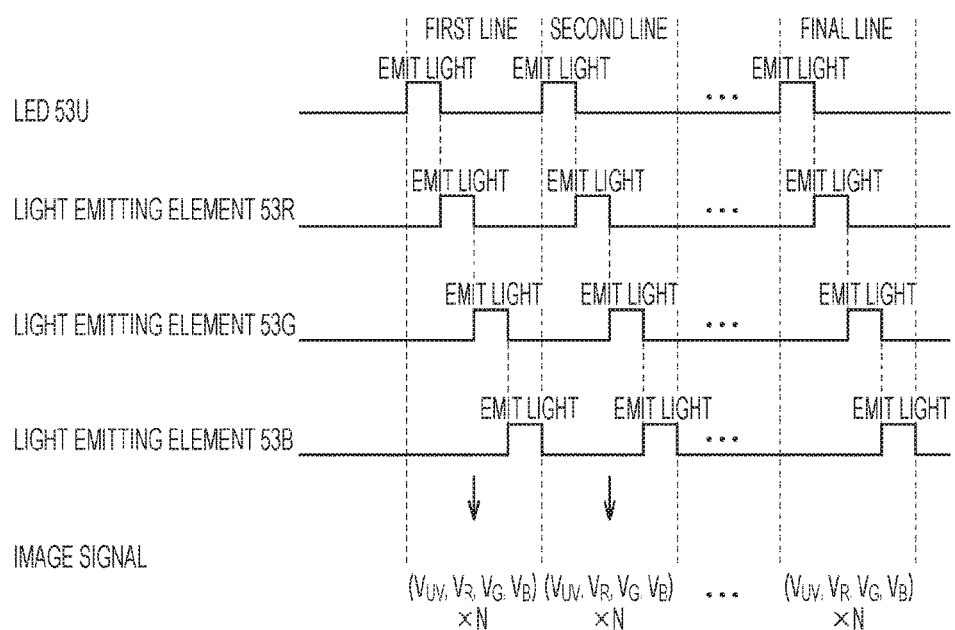
FIG. 9 is a diagram illustrating control signals transmitted to the light emitting elements and the LED.

The following describes a method of controlling the CIS unit 20 with reference to FIGS. 8 and 9. FIG. 8 is a diagram illustrating the CIS unit 20 moving with respect to the sheet S.

As illustrated in FIG. 8, the reading apparatus 100 reads the sheet S while moving the CIS unit 20. At this time, the reading apparatus 100 moves the CIS unit 20 while causing the light emitting elements 53R, 53G, and 53B and the LED 53U to emit light consecutively.

The following describes the control timing of the CIS unit 20. FIG. 9 is a diagram illustrating control signals transmitted to the light emitting elements 53R, 53G, and 53B and the LED 53U. The control signals are transmitted by, for example, the controller 101 (refer to FIG. 14) of the reading apparatus 100.

With reference to FIG. 9, when the reading of the sheet S starts, the controller 101 moves the CIS unit 20 to the first line of the sheet S. Subsequently, the controller 101 causes the LED 53U and the light emitting elements 53R, 53G, and 53B to emit light in an arbitrary order. In the example of FIG. 9, the LED 53U and the light emitting elements 53R, 53G, and 53B emit light in this order.

The line sensor 28 of the CIS unit 20 photoelectrically converts ultraviolet light of the LED 53U and outputs an image signal $V_{UV}$. Subsequently, the line sensor 28 photoelectrically converts red light of the light emitting element 53R and outputs an image signal $V_R$. Subsequently, the line sensor 28 photoelectrically converts green light of the light emitting element 53G and outputs an image signal $V_G$. Subsequently, the line sensor 28 photoelectrically converts blue light of the light emitting element 53B and outputs an image signal $V_B$. The number of each of the image signals $V_{UV}$, $V_R$, $V_G$, and $V_B$ to be output corresponds to the number of imaging elements included in the line sensor 28. For example, in a case where the number of imaging elements included in the line sensor 28 is N, the number of each of the image signals $V_{UV}$, $V_R$, $V_G$, and $V_B$ to be output is N.

When the first line of the sheet S is read, the controller 101 moves the CIS unit 20 to the second line of the sheet S. Subsequently, the controller 101 causes the LED 53U and the light emitting elements 53R, 53G, and 53B to emit light consecutively. Then, the line sensor 28 outputs N image signals $V_{UV}$, $V_R$, $V_G$, and $V_B$ for each.

In this way, the controller 101 causes the CIS unit 20 to move and the LED 53U and the light emitting elements 53R, 53G, and 53B to emit light. The controller 101 repeats such processing up to the final line of the sheet S. As a result, the sheet S is read.

[Correction Processing Using White Plate 23]

As described above, the white plate 23 (refer to FIG. 2) is provided in the reading apparatus 100. The reading apparatus 100 performs shading correction using the white plate 23, so that the light-receiving sensitivities of the line sensor 28 (refer to FIG. 2) with respect to the LED 53U (refer to FIG. 5) and the light emitting elements 53R, 53G, and 53B (refer to FIG. 5) are equalized.

More specifically, when the controller 101 (refer to FIG. 14) of the reading apparatus 100 receives an instruction to read a sheet, the controller 101 moves the line sensor 28 below the white plate 23. Subsequently, the controller 101 causes the LED 53U and the light emitting elements 53R, 53G, and 53B to emit light individually. The controller 101 controls the light emissions of the LED 53U and the UV-LED of the light emitting element 53R such that the level of the image signal $V_{UV}$ and the level of the image signal $V_R$ become equal to each other. The image signal $V_{UV}$ is output from the line sensor 28 which has received the ultraviolet light emitted from the LED 53U and reflected off the white plate 23. The image signal $V_R$ is output from the line sensor 28 which has received the red light emitted from the light emitting element 53R and reflected off the white plate 23. As an example, the controller 101 controls the light emissions of the LED 53U and the light emitting element 53R by controlling each light emission time of the LED 53U and the UV-LED of the light emitting element 53R, as well as the magnitude of the electric current to be applied to the LED 53U and the UV-LED of the light emitting element 53R. The controller 101 also executes similar processing for the light emitting elements 53G and 53B.

Figure 10:
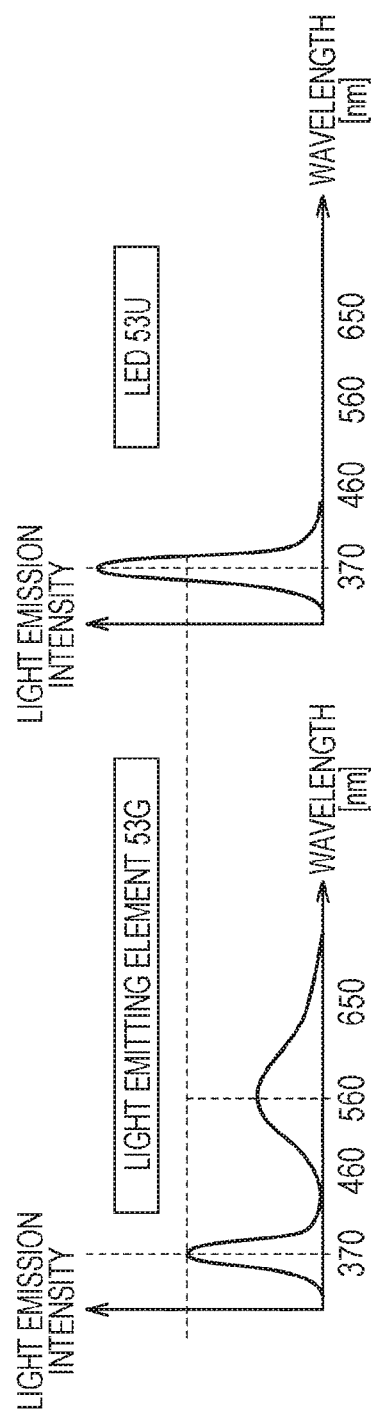
FIG. 10 is a set of graphs illustrating a light emission characteristic of the light emitting element and a light emission characteristic of the LED after a shading correction is made.

The following describes an issue that may arise from the shading correction with reference to FIG. 10. The description will be given with the light emitting element 53G as an example. FIG. 10 is a set of graphs illustrating a light emission characteristic of the light emitting element 53G and a light emission characteristic of the LED 53U after the shading correction is performed.

After the shading correction is performed, the level of the image signal $V_G$ and the level of the image signal $V_{UV}$ become equal to each other. As a result, as illustrated in FIG. 10, the total sum of the light intensities of the light emitting element 53G in the entire wavelength region and the total sum of the light intensities of the LED 53U in the entire wavelength region become equal to each other. However, the intensity of ultraviolet light in the vicinity of the wavelength 370 nm does not become equal between the light emitting element 53G and the LED 53U. As a result, the reading apparatus 100 is unable to completely suppress the influence of the ultraviolet light just by subtracting the image signal $V_{UV}$ obtained by the light emission of the LED 53U from the image signal $V_G$ obtained by the light emission of the light emitting element 53G. Thus, the reading apparatus 100 removes the ultraviolet components after equalizing the ultraviolet components included in the image signal $V_G$ with the ultraviolet components included in the image signal $V_{UV}$.

In one aspect, the controller 101 of the reading apparatus 100 subtracts the image signal $V_{UV}$ from the image signal $V_G$ after amplifying the image signal $V_G$ by a predetermined factor, as indicated by the following expression (1). "$K_G$" in the expression (1) is a constant larger than 1.

$$K_G \times V_G - V_{UV} \tag{1}$$

Similarly, the controller 101 subtracts the image signal $V_{UV}$ from the image signal $V_R$ after amplifying the image signal $V_R$ by a predetermined factor, as indicated by the following expression (2). "$K_R$" in the expression (2) is a constant larger than 1.

$$K_R \times V_R - V_{UV} \tag{2}$$

Similarly, the controller 101 subtracts the image signal $V_{UV}$ from the image signal $V_B$ after amplifying the image signal $V_B$ by a predetermined factor, as indicated by the following expression (3). "$K_B$" in the expression (3) is a constant larger than 1.

$$K_B \times V_B - V_{UV} \tag{3}$$

In another aspect, the controller 101 of the reading apparatus 100 subtracts the image signal $V_{UV}$ from the image signal $V_G$ after attenuating the image signal $V_{UV}$ by a predetermined factor, as indicated by the following expression (4). "$K_G$" in the expression (4) is a constant smaller than 1.

$$V_G - K_G \times V_{UV} \tag{4}$$

Similarly, the controller 101 subtracts the image signal $V_{UV}$ from the image signal $V_R$ after attenuating the image signal $V_{UV}$ by a predetermined factor, as indicated by the following expression (5). "$K_R$" in the expression (5) is a constant smaller than 1.

$$V_R - K_R \times V_{UV} \tag{5}$$

Similarly, the controller 101 subtracts the image signal $V_{UV}$ from the image signal $V_B$ after attenuating the image signal $V_{UV}$ by a predetermined factor, as indicated by the following expression (6). "$K_B$" in the expression (6) is a constant smaller than 1.

$$V_B - K_B \times V_{UV} \tag{6}$$

Preferably, the attenuation factor of the image signal $V_{UV}$ or the amplification factor of the image signals $V_R$, $V_G$, and $V_B$ is changed by the controller 101 according to at least one of the total light emission time of the LED 53U up to the present time and each total light emission time of the light emitting elements 53R, 53G, and 53B up to the present time. The attenuation factor or the amplification factor corresponds to the coefficients $K_R$, $K_G$, and $K_B$ indicated by the expressions (1) to (6).

More specifically, each time the LED 53U and the light emitting elements 53R, 53G, and 53B emit light consecutively, the controller 101 counts each light emission time of the LED 53U and the light emitting elements 53R, 53G, and 53B. Each light emission time is stored in, for example, a storage 120, which will be described later. The ratios of the ultraviolet components included in the image signals $V_R$, $V_G$, and $V_B$ change in proportion to each light emission time. Therefore, the controller 101 changes each of the coefficients $K_R$, $K_G$, and $K_B$ in proportion to the corresponding light emission time of the LED 53U and the light emitting elements 53R, 53G, and 53B. Optimal values for the coefficients $K_R$, $K_G$, and $K_B$ with respect to the light emission time are determined in advance by experiments or the like.

More preferably, the attenuation factor of the image signal $V_u$v or the amplification factor of the image signals $V_R$, $V_G$, and $V_B$ is changed by the controller 101 according to the ambient temperature of the LED 53U or the light emitting elements 53R, 53G, and 53B. The temperature is detected by the temperature sensor 57 (refer to FIG. 5). The temperature sensor 57 is provided in the vicinity of the LED 53U and the light emitting elements 53R, 53G, and 53B. The ratios of the ultraviolet components included in the image signals $V_R$, $V_G$, and $V_B$ change according to the temperature. Therefore, the controller 101 changes the coefficients $K_R$, $K_G$, and $K_B$ according to the temperature detected by the temperature sensor 57. Optimal values for the coefficients $K_R$, $K_G$, and $K_B$ with respect to the detected temperature are determined in advance by experiments or the like.

[Correction Processing Using Purple Plate 24]

As described with reference to FIG. 2, the purple plate 24 (reflection plate) is provided in the reading apparatus 100. The purple plate 24 reflects more ultraviolet light than light in the visible region. Preferably, the purple plate 24 reflects ultraviolet light only. Using the purple plate 24, the reading apparatus 100 equalizes the levels of the ultraviolet components included in the respective image signals $V_R$, $V_G$, and $V_B$ with the level of the ultraviolet components included in the image signal $V_{UV}$.

More specifically, when the controller 101 (refer to FIG. 14) of the reading apparatus 100 receives an instruction to read a sheet, the controller 101 moves the line sensor 28 below the purple plate 24. Subsequently, the controller 101 causes the LED 53U (refer to FIG. 5) and the light emitting elements 53R, 53G, and 53B (refer to FIG. 5) to emit light individually. The controller 101 controls the light emissions of the LED 53U and the UV-LED of the light emitting element 53R such that the level of the image signal $V_{UV}$ and the level of the image signal $V_R$ become equal to each other. The image signal $V_{UV}$ is output from the line sensor 28 which has received the ultraviolet light emitted from the LED 53U and reflected off the purple plate 24. The image signal $V_R$ is output from the line sensor 28 which has received the light emitted from the light emitting element 53R and reflected off the purple plate 24. As an example, the controller 101 controls the light emissions of the LED 53U and the light emitting element 53R by controlling each light emission time of the LED 53U and the UV-LED of the light emitting element 53R, as well as the magnitude of the electric current to be applied to the LED 53U and the UV-LED of the light emitting element 53R. The controller 101 also executes similar processing for the light emitting elements 53G and 53B.

Figure 11:
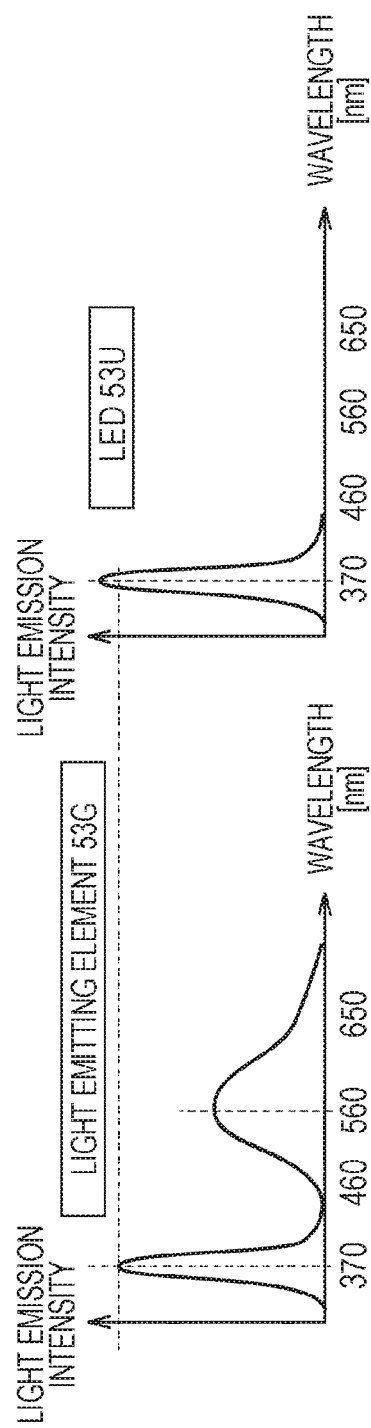
FIG. 11 is a set of graphs illustrating a light emission characteristic of the light emitting element and a light emission characteristic of the LED after correction processing is performed using a purple plate.

FIG. 11 is a set of graphs illustrating a light emission characteristic of the light emitting element 53G and a light emission characteristic of the LED 53U after the correction processing is performed using the purple plate 24. As illustrated in FIG. 11, the levels of the ultraviolet components included in the image signals $V_G$ and $V_{uv}$ output from the line sensor 28 become equal to each other by the correction processing using the purple plate 24. Accordingly, just by subtracting the image signal $V_{UV}$ from the image signal $V_G$, the controller 101 can remove the ultraviolet components from the image signal $V_G$. In other words, the coefficients $K_R$, $K_G$, and $K_B$ indicated by the above-described expressions (1) to (6) can be approximated to 1.

In the example described above, the purple plate 24 is provided in the reading apparatus 100. Alternatively, instead of providing the purple plate 24, a paint for reflecting ultraviolet light may be applied to a portion of the white plate 23 (refer to FIG. 2). The paint reflects more ultraviolet light than light in the visible region. Preferably, the paint reflects ultraviolet light only.

The following describes more concrete correction processing. When the controller 101 receives an instruction to read a sheet, the controller 101 moves the line sensor 28 below the paint. The controller 101 controls the light emissions of the LED 53U and the UV-LED of the light emitting element 53R such that the level of the image signal $V_{UV}$ and the level of the image signal $V_R$ become equal to each other. The image signal $V_{UV}$ is output from the line sensor 28 which has received the ultraviolet light emitted from the LED 53U and reflected off the paint. The image signal $V_R$ is output from the line sensor 28 which has received the light emitted from the light emitting element 53R and reflected off the paint. The controller 101 also executes similar processing for the light emitting elements 53G and 53B.

[Control Structure of Reading Apparatus 100]

Figure 12:
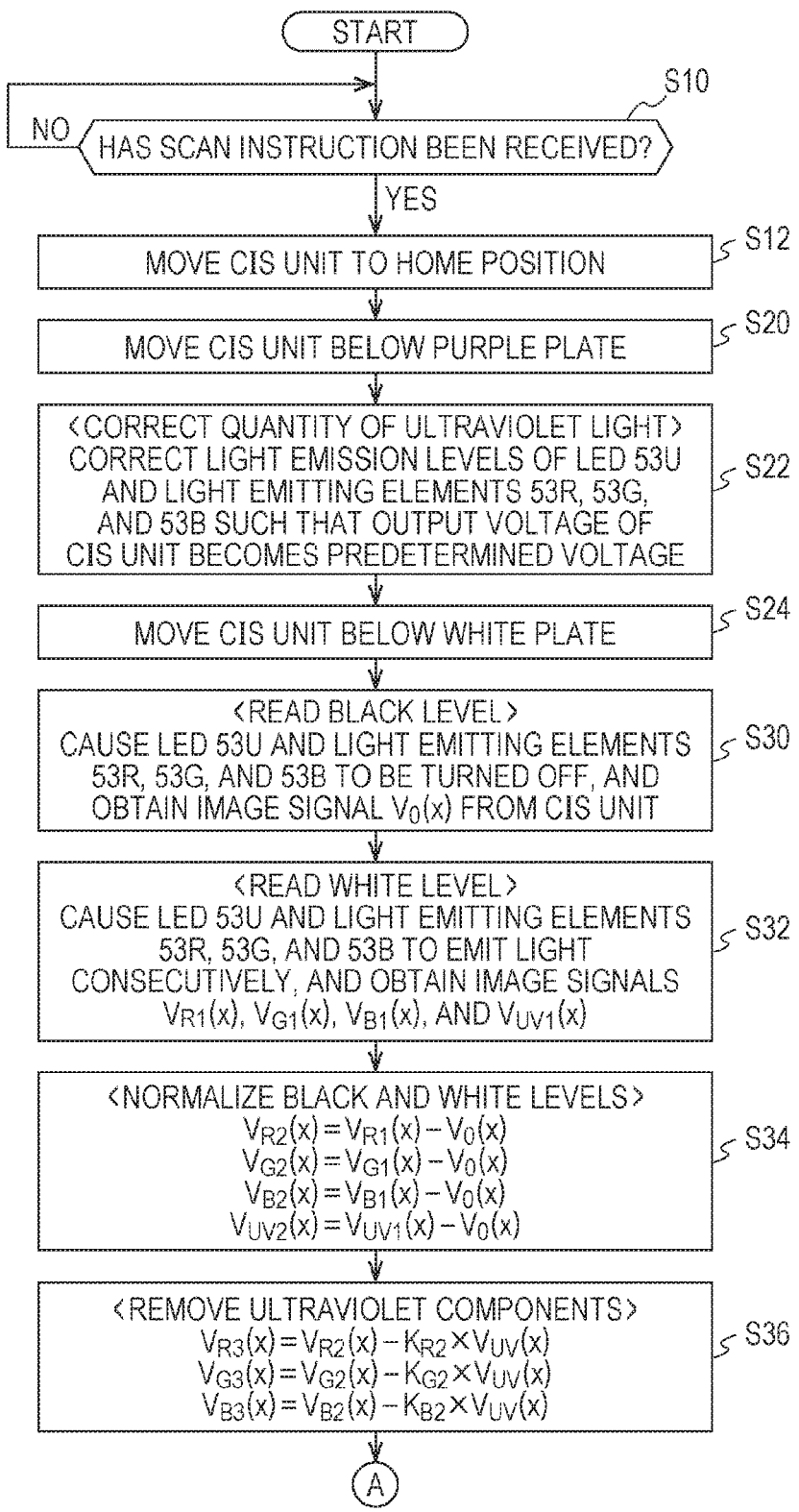
FIG. 12 is a flowchart illustrating part of processing to be executed by the reading apparatus according to the first embodiment.
Figure 13:
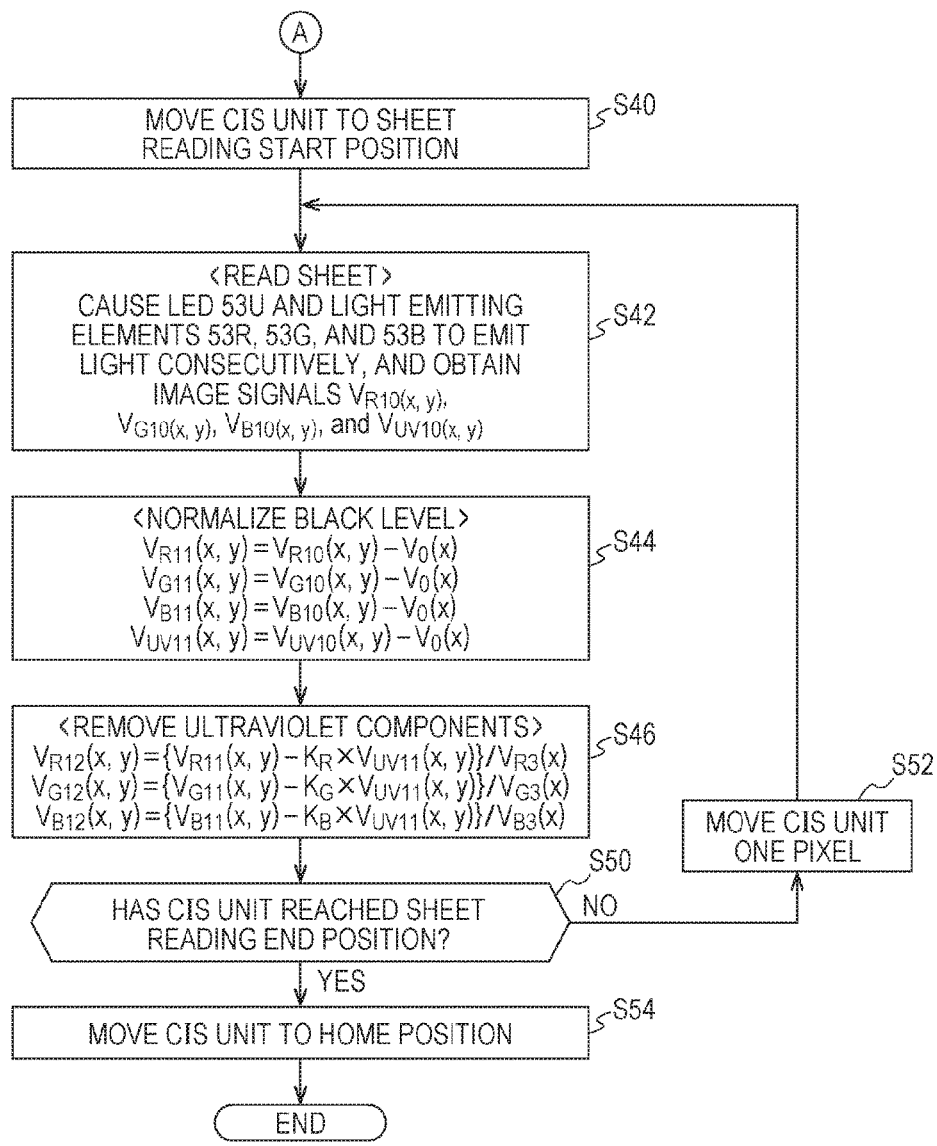
FIG. 13 is a flowchart illustrating part of the processing to be executed by the reading apparatus according to the first embodiment.

The following describes a control structure of the reading apparatus 100 with reference to FIGS. 12 and 13. FIGS. 12 and 13 are flowcharts illustrating part of the processing to be executed by the reading apparatus 100. The processing in FIGS. 12 and 13 is performed when a program is executed by the controller 101 (refer to FIG. 14) of the reading apparatus 100. In another aspect, part or all of the processing may be executed by a circuit element or other hardware.

Hereinafter, the longitudinal direction of the CIS unit 20 (refer to FIG. 2) is assumed to be an x-direction. More specifically, the x-direction corresponds to the direction in which the imaging elements of the CIS unit 20 are arranged. The direction orthogonal to the x-direction is assumed to be a y-direction. More specifically, the y-direction corresponds to the direction in which the CIS unit 20 is driven.

In step S10, the controller 101 determines whether a scan instruction has been received. When the controller 101 determines that the scan instruction has been received (YES in step S10), the controller 101 switches the control to step S12. If not (NO in step S10), the controller 101 executes the processing in step S10 again.

In step S12, the controller 101 moves the CIS unit 20 to a home position. Whether the CIS unit 20 has reached the home position is detected by a sensor (not illustrated) such as a photosensor.

In step S20, the controller 101 moves the CIS unit 20 below the purple plate 24 (refer to FIG. 2).

In step S22, the controller 101 corrects the light emission levels of the LED 53U and the light emitting elements 53R, 53G, and 53B using the purple plate 24, such that the output voltage of the CIS unit 20 becomes a predetermined voltage. The correction processing using the purple plate 24 is as described above. Therefore, the description of the correction processing is not repeated.

In step S24, the controller 101 moves the CIS unit 20 below the white plate 23 (refer to FIG. 2).

In step S30, the controller 101 obtains an image signal $V_0$ (x) from the CIS unit 20 in a state where the LED 53U and the light emitting elements 53R, 53G, and 53B are turned off. The image signal $V_0$ (x) represents a collection of image signals output from each of the imaging elements of the CIS unit 20. "x" of the image signal $V_0$ (x) represents a coordinate in the x-direction.

In step S32, the controller 101 causes the LED 53U and the light emitting elements 53R, 53G, and 53B to emit light consecutively, and then obtains image signals from the CIS unit 20. More specifically, the controller 101 obtains an image signal $V_{R1}$ (x) from the CIS unit 20 in a state where the light emitting element 53R emits light below the white plate 23. Subsequently, the controller 101 obtains an image signal $V_{G1}$ (x) from the CIS unit 20 in a state where the light emitting element 53G emits light below the white plate 23. Subsequently, the controller 101 obtains an image signal $V_{B1}$ (x) from the CIS unit 20 in a state where the light emitting element 53B emits light below the white plate 23. Subsequently, the controller 101 obtains an image signal $V_{UV1}$ (x) from the CIS unit 20 in a state where the LED 53U emits light below the white plate 23. The image signals $V_{R1}$ (x), $V_{G1}$ (x), $V_{B1}$ (x), and $V_{UV1}$ (x) each represent a collection of image signals output from each of the imaging elements of the CIS unit 20. "x" of the image signals $V_{R1}$ (x), $V_{G1}$ (x), $V_{B1}$ (x), and $V_{UV1}$ (x) represents a coordinate in the x-direction.

In step S34, the controller 101 absorbs the difference in sensitivity of the CIS unit 20 between the turn-off state and the light emitting state of the LED 53U and the light emitting elements 53R, 53G, and 53B. More specifically, the controller 101 calculates image signals $V_{R2}(x)$, $V_{G2}(x)$, $V_{B2}(x)$, and $V_{UV2}(x)$ according to the following expressions (7) to (10).

$$V_{R2}(x)=V_{R1}(x)-V_0(x) \quad (7)$$

$$V_{G2}(x)=V_{G1}(x)-V_0(x) \quad (8)$$

$$V_{B2}(x)=V_{B1}(x)-V_0(x) \quad (9)$$

$$V_{UV2}(x)=V_{UV1}(x)-V_0(x) \quad (10)$$

In step S36, the controller 101 removes the ultraviolet components, i.e., the image signal $V_{UV2}(x)$, from the image signals $V_{R2}(x)$, $V_{G2}(x)$, and $V_{B2}(x)$ according to the following expressions (11) to (13). As a result, image signals $V_{R3}(x)$, $V_{G3}(x)$, and $V_{B3}(x)$ are obtained. "$K_R$" in the expression (11) is a constant. "$K_G$" in the expression (12) is a constant. "$K_B$" in the expression (13) is a constant.

$$V_{R3}(x)=V_{R2}(x)-K_R \times V_{UV2}(x) \quad (11)$$

$$V_{G3}(x)=V_{G2}(x)-K_G \times V_{UV2}(x) \quad (12)$$

$$V_{B3}(x)=V_{B2}(x)-K_B \times V_{UV2}(x) \quad (13)$$

In step S40, the controller 101 moves the CIS unit 20 to a sheet reading start position.

In step S42, the controller 101 causes the LED 53U and the light emitting elements 53R, 53G, and 53B to emit light consecutively, and obtains image signals from the CIS unit 20. More specifically, the controller 101 causes the light emitting element 53R to emit light, and obtains an image signal $V_{R10}(x, y)$ from the CIS unit 20. Subsequently, the controller 101 causes the light emitting element 53G to emit light, and obtains an image signal $V_{G10}(x, y)$ from the CIS unit 20. Subsequently, the controller 101 causes the light emitting element 53B to emit light, and obtains an image signal $V_{B10}(x, y)$ from the CIS unit 20. Subsequently, the controller 101 causes the LED 53U to emit light, and obtains an image signal $V_{UV10}(x, y)$ from the CIS unit 20. "(x, y)" represents coordinates in the x-direction and the y-direction.

In step S44, the controller 101 absorbs the difference in sensitivity of the CIS unit 20 between the turn-off state and the light emitting state of the LED 53U and the light emitting elements 53R, 53G, and 53B according to the following expressions (14) to (17). As a result, image signals $V_{R11}(x, y)$, $V_{G11}(x, y)$, $V_{B11}(x, y)$, and $V_{UV11}(x, y)$ are obtained.

$$V_{R11}(x,y)=V_{R10}(x,y)-V_0(x) \quad (14)$$

$$V_{G11}(x,y)=V_{G10}(x,y)-V_0(x) \quad (15)$$

$$V_{B11}(x,y)=V_{B10}(x,y)-V_0(x) \quad (16)$$

$$V_{UV11}(x,y)=V_{UV10}(x,y)-V_0(x) \quad (17)$$

In step S46, the controller 101 removes the ultraviolet components from the image signals $V_{R11}(x, y)$, $V_{G11}(x, y)$, and $V_{B11}(x, y)$ and absorbs the difference in sensitivity of the CIS unit 20 according to the following expressions (18) to (20). As a result, image signals $V_{R12}(x, y)$, $V_{G12}(x, y)$, and $V_{B12}(x, y)$ are obtained. "$K_R$" in the expression (18) is a constant. "$K_G$" in the expression (19) is a constant. "$K_B$" in the expression (20) is a constant.

$$V_{R12}(x,y)=\{V_{R11}(x,y)-K_R \times V_{UV11}(x,y)\}/V_{R3}(x) \quad (18)$$

$$V_{G12}(x,y)=\{V_{G11}(x,y)-K_G \times V_{UV11}(x,y)\}/V_{G3}(x) \quad (19)$$

$$V_{B12}(x,y)=\{V_{B11}(x,y)-K_B \times V_{UV11}(x,y)\}/V_{B3}(x) \quad (20)$$

In step S50, the controller 101 determines whether the CIS unit 20 has reached a sheet reading end position. When the controller 101 determines that the CIS unit 20 has reached the sheet reading end position (YES in step S50), the controller 101 switches the control to step S54. If not (NO in step S50), the controller 101 switches the control to step S52.

In step S52, the controller 101 moves the CIS unit 20 in the y-direction a distance corresponding to one pixel. The controller 101 repeats the processing in steps S50 and S52, so that the CIS unit 20 is successively moved from the sheet reading start position to the sheet reading end position in the y-direction. As a result, the controller 101 obtains image information $V_{R12}(x, y)$, $V_{G12}(x, y)$, and $V_{B12}(x, y)$. The image information $V_{R12}(x, y)$ represents red components of the entire sheet. The image information $V_{G12}(x, y)$ represents green components of the entire sheet. The image information $V_{B12}(x, y)$ represents blue components of the entire sheet.

In step S54, the controller 101 moves the CIS unit 20 to the home position, and ends the reading processing according to the present embodiment.

[Hardware Configuration of Reading Apparatus 100]

Figure 14:
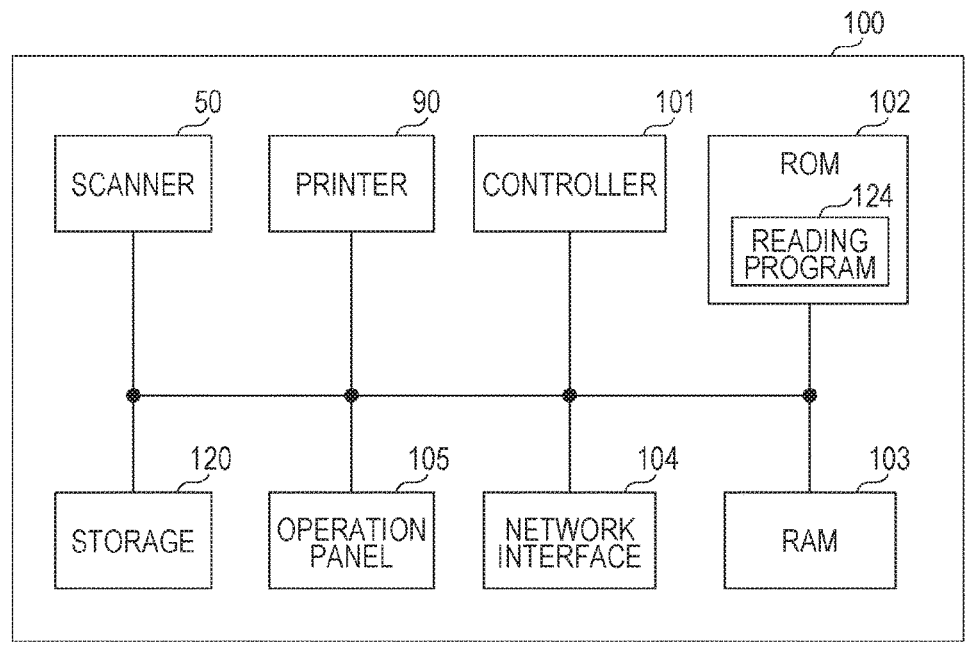
FIG. 14 is a block diagram illustrating an exemplary hardware configuration of the reading apparatus according to the first embodiment.

The following describes an exemplary hardware configuration of the reading apparatus 100 with reference to FIG. 14. FIG. 14 is a block diagram illustrating the exemplary hardware configuration of the reading apparatus 100.

As illustrated in FIG. 14, the reading apparatus 100 includes the scanner 50, the printer 90, the controller 101, a read only memory (ROM) 102, a random access memory (RAM) 103, a network interface 104, an operation panel 105, and the storage 120. The scanner 50 and the printer 90 are as described with reference to FIG. 1. Therefore, the descriptions thereof are not repeated.

The controller 101 includes at least one integrated circuit, for example. The integrated circuit includes, for example, at least one central processing unit (CPU), at least one application specific integrated circuit (ASIC), at least one field programmable gate array (FPGA) or a combination thereof.

The controller 101 controls the operations of the reading apparatus 100 by executing various programs such as a reading program 124 according to the present embodiment. Upon receiving an instruction to execute the reading program 124, the controller 101 reads the reading program 124 stored in the ROM 102. The RAM 103 functions as a working memory, and temporarily stores various data necessary for executing the reading program 124.

An antenna (not illustrated) or the like is connected to the network interface 104. The reading apparatus 100 exchanges data with an external communication device through the antenna. Examples of the external communication device include a mobile communication terminal such as a smartphone, and a server. The reading apparatus 100 may also be configured such that the reading program 124 according to the present embodiment can be downloaded from a server through the antenna.

The operation panel 105 includes a touch panel and a display section, for example. The touch panel and the display section are overlaid with each other. The operation panel 105 receives a touch operation to the display section. For example, the operation panel 105 receives a sheet reading operation such as a scan operation and a printing operation from a user. When the operation panel 105 receives the reading operation, the reading apparatus 100 starts reading the sheet.

The storage 120 is a storage medium such as a hard disk or an external storage device.

The reading program 124 may be provided as part of an arbitrary program, instead of a single program. In this case, the processing according to the present embodiment is performed in cooperation with the arbitrary program. Even such a program that does not include part of the modules does not depart from the gist of the reading program 124 according to the present embodiment. Furthermore, part or all of the functions provided by the reading program 124 may be realized by dedicated hardware. Furthermore, the configuration of the reading apparatus 100 may be in the form of a so-called cloud service or the like where at least one server executes part of the processing of the reading program 124.

[Summary]

As described above, the reading apparatus 100 according to the present embodiment includes the LED 53U that emits ultraviolet light and the light emitting elements 53R, 53G, and 53B. The light emitting element 53R includes the UV-LED and the red phosphor. The UV-LED emits ultraviolet light. The red phosphor is excited by the ultraviolet light emitted from the UV-LED. The light emitting element 53G includes the UV-LED and the green phosphor. The UV-LED emits ultraviolet light. The green phosphor is excited by the ultraviolet light emitted from the UV-LED. The light emitting element 53B includes the UV-LED and the blue phosphor. The UV-LED emits ultraviolet light. The blue phosphor is excited by the ultraviolet light emitted from the UV-LED.

The controller 101 of the reading apparatus 100 causes the LED 53U and the light emitting elements 53R, 53G, and 53B to emit light in an arbitrary order. The line sensor 28 receives the light emitted from the LED 53U and reflected off the sheet. The line sensor 28 then generates an image signal $V_{UV}$ representing ultraviolet components of the sheet. The line sensor 28 receives the light emitted from the light emitting element 53R and reflected off the sheet. The line sensor 28 then generates an image signal $V_R$ representing red components of the sheet. The line sensor 28 receives the light emitted from the light emitting element 53G and reflected off the sheet. The line sensor 28 then generates an image signal $V_G$ representing green components of the sheet. The line sensor 28 receives the light emitted from the light emitting element 53B and reflected off the sheet. The line sensor 28 then generates an image signal $V_B$ representing blue components of the sheet.

The controller 101 outputs a differential signal $V_R$ obtained by subtracting the image signal $V_{UV}$ from the image signal $V_R$. The controller 101 outputs a differential signal $V_G$ obtained by subtracting the image signal $V_{UV}$ from the image signal $V_G$. The controller 101 outputs a differential signal $V_B$ obtained by subtracting the image signal $V_{UV}$ from the image signal $V_B$. The controller 101 generates a color image by combining the differential signals $V_R$, $V_G$, and $V_B$.

By performing the processing above, the reading apparatus 100 can remove the ultraviolet components, i.e., the image signal $V_{UV}$, from the image signals $V_R$, $V_G$, and $V_B$. Therefore, the color reproducibility of the sheet that has been read can be improved. In addition, the spectrum of light emitted from a phosphor is distributed more widely than the spectrum of light emitted from an LED. By generating an image from the light of the phosphor, therefore, the color reproducibility is more improved. Furthermore, the line sensor 28 included in the reading apparatus 100 is of an inexpensive type that is not provided with a color filter. Therefore, the cost of the reading apparatus 100 can be reduced. Furthermore, there can be just one line sensor 28 included in the reading apparatus 100. Therefore, the cost for the line sensor 28 can be reduced.

Second Embodiment

[CIS Unit 20]

Figure 15:
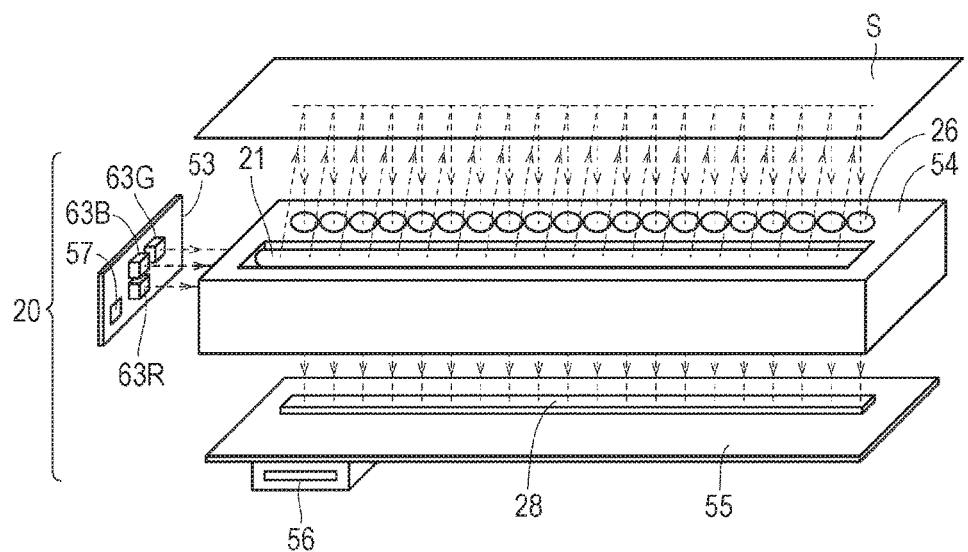
FIG. 15 is a view illustrating a structure of a CIS unit according to a second embodiment.

The following describes a CIS unit 20 mounted in a reading apparatus 100 according to the second embodiment with reference to FIG. 15. FIG. 15 is a view illustrating a structure of the CIS unit 20 according to the second embodiment.

In the first embodiment, the CIS unit 20 includes the LED 53U that emits ultraviolet light, the light emitting element 53R that emits red light, the light emitting element 53G that emits green light, and the light emitting element 53B that emits blue light. By contrast, in the second embodiment, the CIS unit 20 includes an LED 63B that emits blue light, instead of the LED 53U and the light emitting element 53B. In addition, the CIS unit 20 includes a light emitting element 63R and a light emitting element 63G, instead of the light emitting element 53R and the light emitting element 53G, respectively. Each of the light emitting element 63R and the light emitting element 63G includes an LED that emits blue light as an excitation light source.

More specifically, the CIS unit 20 includes circuit substrates 53 and 55 and a housing 54. In the circuit substrate 53, the LED 63B, the light emitting elements 63R and 63G, and a temperature sensor 57 are provided. In the housing 54, a light guide 21 and a lens array 26 are provided. In the circuit substrate 55, a line sensor 28 and a connector 56 for an FFC are provided.

The LED 63B (first LED) emits blue light. The blue light is light in a visible region and has a wavelength of 450 nm to 495 nm. The blue light emitted from the LED 63B enters and travels through the light guide 21, and strikes the sheet S. After the blue light is reflected off the sheet S and passes through the lens array 26, the blue light enters the line sensor 28.

The light emitting element 63R includes an LED (second LED) and a red phosphor. The LED (second LED) emits blue light. The red phosphor emits red light as a result of being excited by the blue light emitted from the LED. As an example, the LED emits blue light having a wavelength of 450 nm to 495 nm. The red phosphor absorbs the blue light as excitation light and emits red light having a longer wavelength (e.g., 620 nm to 750 nm) than the blue light. The red light emitted from the light emitting element 63R enters and travels through the light guide 21, and strikes the sheet S. After the red light is reflected off the sheet S and passes through the lens array 26, the red light enters the line sensor 28.

The light emitting element 63G includes an LED (second LED) and a green phosphor. The LED (second LED) emits blue light. The green phosphor emits green light as a result of being excited by the blue light emitted from the LED. As an example, the LED emits blue light having a wavelength of 450 nm to 495 nm. The green phosphor absorbs the blue light as excitation light and emits green light having a longer wavelength (e.g., 495 nm to 570 nm) than the blue light. The green light emitted from the light emitting element 63G enters and travels through the light guide 21, and strikes the sheet S. After the green light is reflected off the sheet S and passes through the lens array 26, the green light enters the line sensor 28.

The line sensor 28 includes, for example, a plurality of imaging elements. Each imaging element is, for example, a CMOS. Each imaging element is arranged in a row so as to be orthogonal to the direction in which the CIS unit 20 is driven. The CIS unit 20 receives light reflected off the sheet S while being driven. Then, each imaging element of the CIS unit 20 photoelectrically converts the light reflected off the sheet S, and outputs an electrical signal according to the quantity of reflected light. The electrical signal is then output to a controller 101 (refer to FIG. 14). The controller 101 quantifies, as a pixel value, the magnitude of each electrical signal received from each imaging element, and arranges the pixel values for each imaging element in chronological order. In this way, an image representing the sheet S is generated.

[Light Emission Characteristics]

Figure 16:
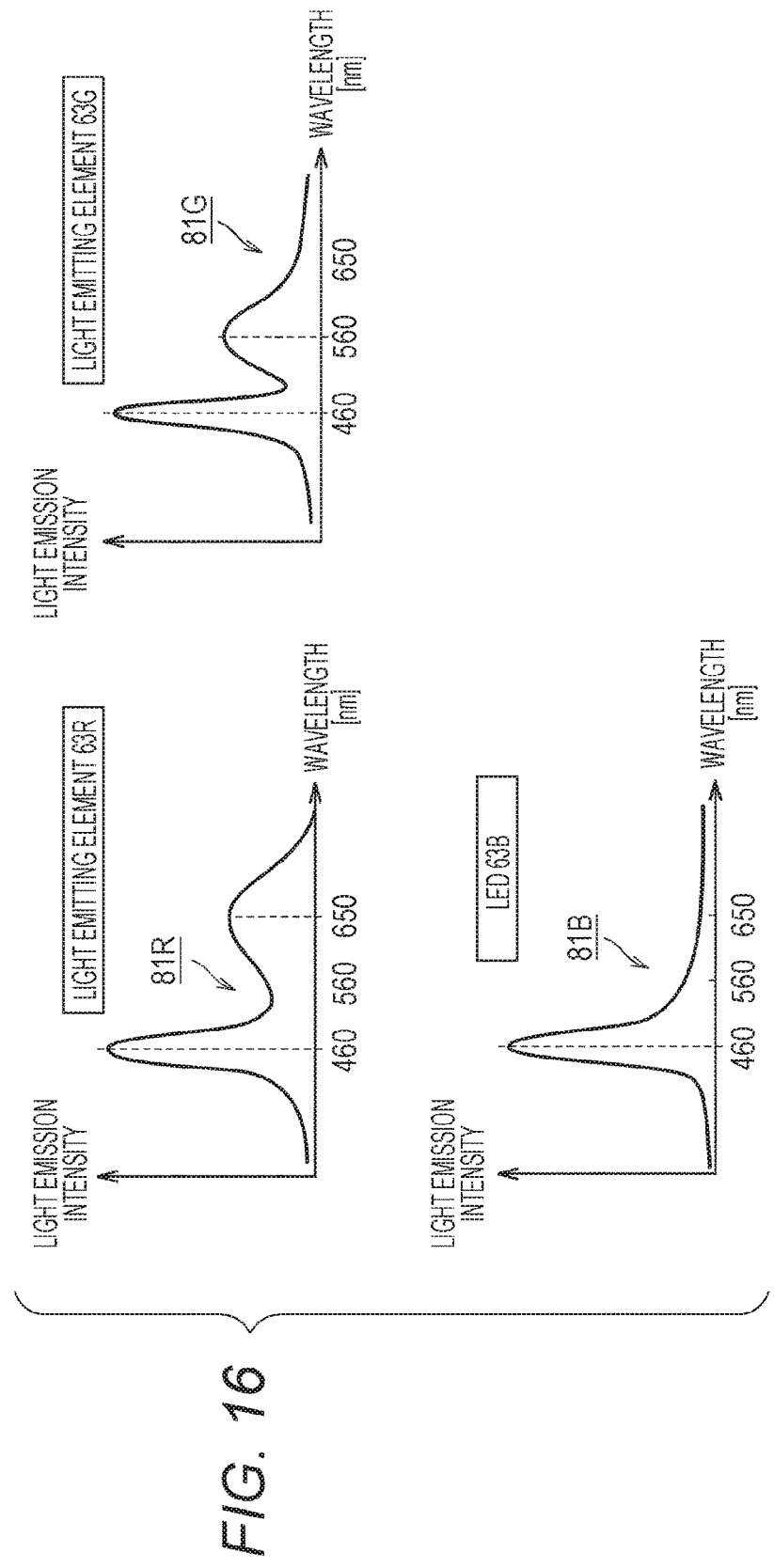
FIG. 16 is a set of graphs illustrating light emission characteristics of light emitting elements and a light emission characteristic of an LED.

The following describes the light emission characteristics of the light emitting elements 63R and 63G and the LED 63B illustrated in FIG. 15, with reference to FIG. 16. FIG. 16 is a set of graphs illustrating the light emission characteristics of the light emitting elements 63R and 63G and the light emission characteristic of the LED 63B.

In FIG. 16, graphs 81R, 81G, and 81B are illustrated. The light emission characteristic of the light emitting element 63R is illustrated in the graph 81R. As described above, the light emitting element 63R includes the LED that emits blue light and the red phosphor. Hereinafter, an LED that emits blue light will be referred to as a "BL-LED". The BL-LED excites the red phosphor by emitting, to the red phosphor, blue light having a wavelength of approximately 460 nm. In response, the red phosphor emits red light having a wavelength of approximately 650 nm. Since the red phosphor is excited by the blue light, the light emission intensities of the red light and blue light are higher than those of other colors in the light emitting element 63R.

The light emission characteristic of the light emitting element 63G is illustrated in the graph 81G. As described above, the light emitting element 63G includes the BL-LED and the green phosphor. The BL-LED excites the green phosphor by emitting, to the green phosphor, blue light having a wavelength of approximately 460 nm. In response, the green phosphor emits green light having a wavelength of approximately 560 nm. Since the green phosphor is excited by the blue light, the light emission intensities of the green light and blue light are higher than those of other colors in the light emitting element 63G.

The light emission characteristic of the LED 63B is illustrated in the graph 81B. As described above, the LED 63B is a BL-LED and emits blue light. Therefore, the light emission intensity of the blue light is higher than those of other colors in the LED 63B.

[Method of Generating Image Signals]

Figure 17:
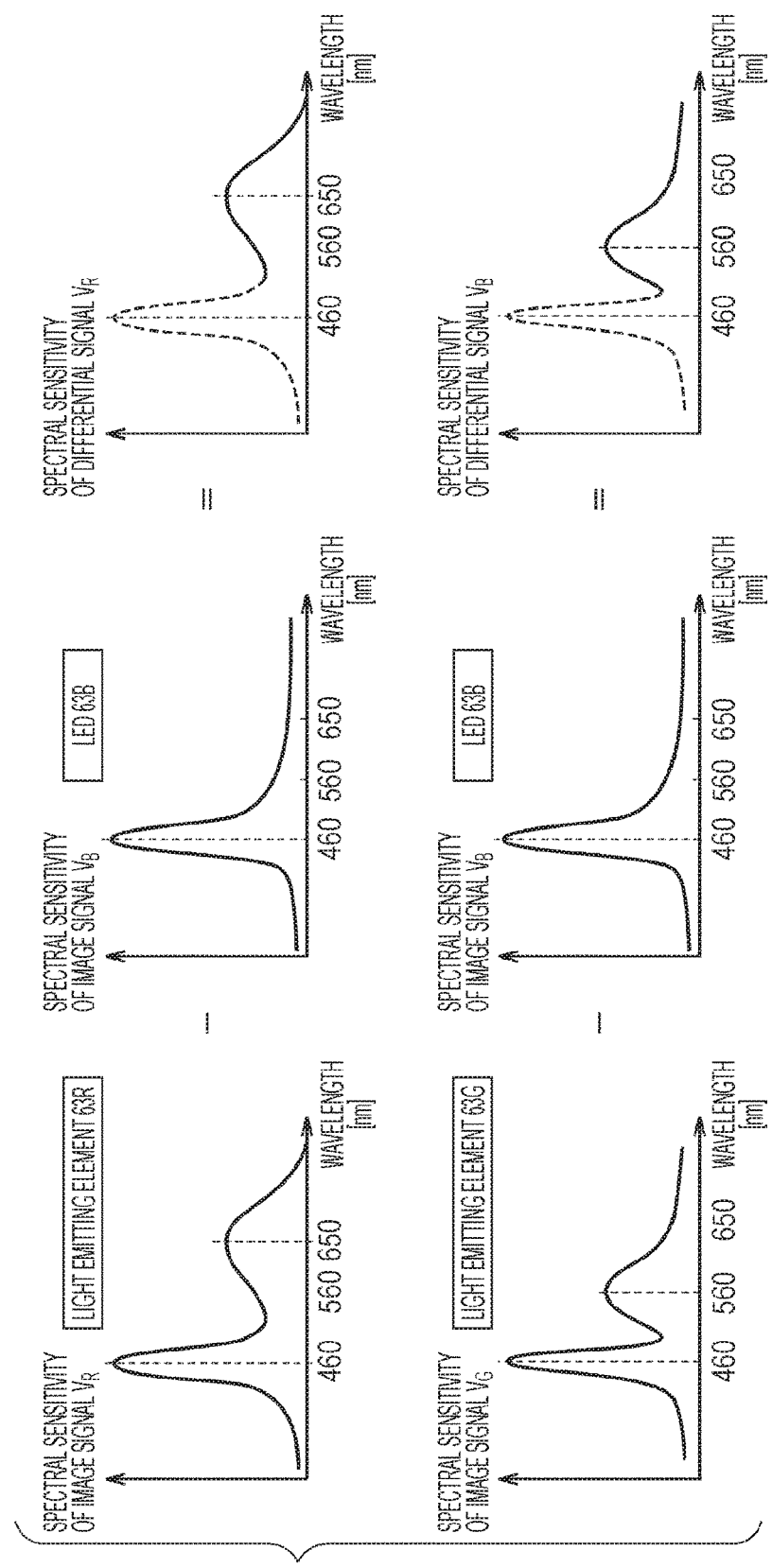
FIG. 17 is a set of conceptual graphs schematically illustrating methods of generating image signals according to the second embodiment.

The following describes a method of generating image signals in the reading apparatus 100 with reference to FIG. 17. FIG. 17 is a set of conceptual graphs schematically illustrating methods of generating the image signals according to the second embodiment.

As described above, the light emitting element 63R emits red light as a result of being excited by blue light. Consequently, unnecessary blue light is included in the light emitted from the light emitting element 63R. Since the line sensor 28 (refer to FIG. 15) performs photoelectric conversion according to the quantity of light including both red light and blue light, the quantity of blue light is also reflected in an image signal. As a result, the reading apparatus 100 needs to remove blue components in order to just read red components from the sheet. Therefore, from an image signal that the line sensor 28 generates as a result of the light emission of the light emitting element 63R, the reading apparatus 100 subtracts an image signal that the line sensor 28 generates as a result of the light emission of the LED 63B emitting blue light. In this way, the reading apparatus 100 removes the blue components.

More specifically, the reading apparatus 100 causes the LED 63B to emit light. Subsequently, the line sensor 28 receives the blue light emitted from the LED 63B and reflected off the sheet. The line sensor 28 then generates an image signal $V_B$ (reference signal) according to the quantity of received light.

Subsequently, the reading apparatus 100 causes the light emitting element 63R to emit light. The line sensor 28 receives the red light emitted from the light emitting element 63R and reflected off the sheet. The line sensor 28 then generates an image signal $V_R$ (first image signal) according to the quantity of received light. The controller 101 (refer to FIG. 14) of the reading apparatus 100 subtracts the image signal $V_B$ from the image signal $V_R$. The controller 101 then outputs a differential signal $V_R$ as a result of the subtraction. In this way, the blue components are removed from the image signal $V_R$.

Subsequently, the reading apparatus 100 causes the light emitting element 63G to emit light. The line sensor 28 receives the green light emitted from the light emitting element 63G and reflected off the sheet. The line sensor 28 then generates an image signal $V_G$ (second image signal) according to the quantity of received light. The controller 101 subtracts the image signal $V_B$ from the image signal $V_G$. The controller 101 then outputs a differential signal $V_G$ as a result of the subtraction. In this way, the blue components are removed from the image signal $V_G$.

The controller 101 generates a color image representing the sheet by combining the differential signal $V_R$ (subtraction result), the differential signal $V_G$ (subtraction result), and the image signal $V_B$. The differential signal $V_R$ is obtained by subtracting the image signal $V_B$ from the image signal $V_R$. The differential signal $V_G$ is obtained by subtracting the image signal $V_B$ from the image signal $V_G$. In this way, the controller 101 generates a color image after removing the unnecessary blue components from the image signals $V_R$ and $V_G$. Therefore, a color image having high color reproducibility can be generated.

[Correction Processing Using Blue Plate 24A]

Figure 18:
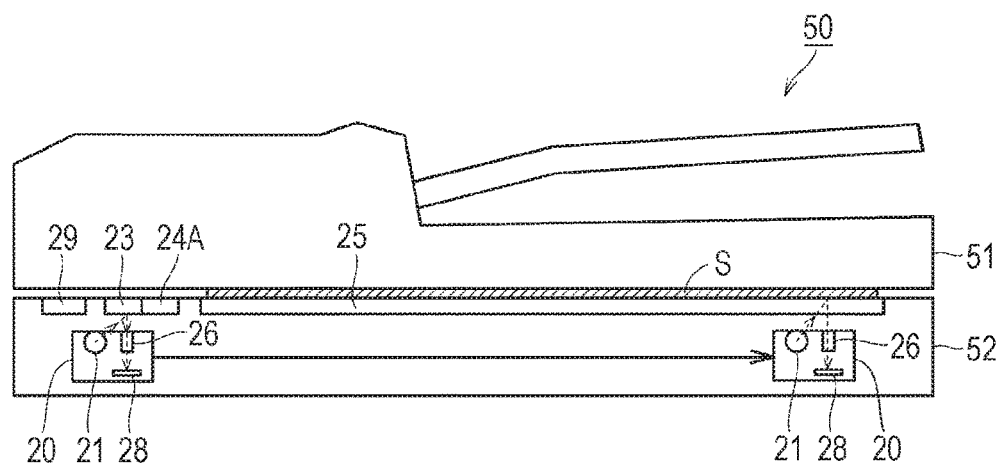
FIG. 18 is a view illustrating an external appearance of a scanner according to the second embodiment.

The following describes processing for correcting image signals using a blue plate 24A with reference to FIG. 18. FIG. 18 is a view illustrating an external appearance of a scanner 50 according to the second embodiment.

As illustrated in FIG. 18, the blue plate 24A (reflection plate) is provided instead of the purple plate 24 (refer to FIG. 2) in the second embodiment. The blue plate 24A reflects more blue light having a wavelength of 450 nm to 495 nm than other colors of light. Preferably, the blue plate 24A reflects blue light only. Using the blue plate 24A, the reading apparatus 100 equalizes the levels of the blue components included in the respective image signals $V_R$ and $V_G$ with the level of the blue components included in the image signal $V_B$.

More specifically, when the controller 101 (refer to FIG. 14) of the reading apparatus 100 receives an instruction to read a sheet, the controller 101 moves the line sensor 28 below the blue plate 24A. Subsequently, the controller 101 causes the light emitting elements 63R and 63G (refer to FIG. 15) and LED 63B (refer to FIG. 15) to emit light individually. The controller 101 controls the light emissions of the LED 63B and the BL-LED of the light emitting element 63R such that the level of the image signal $V_B$ and the level of the image signal $V_R$ become equal to each other. The image signal $V_B$ is output from the line sensor 28 which has received the blue light emitted from the LED 63B and reflected off the blue plate 24A. The image signal $V_R$ is output from the line sensor 28 which has received the light emitted from the light emitting element 63R and reflected off the blue plate 24A. As an example, the controller 101 controls the light emissions of the LED 63B and the light emitting element 63R by controlling each light emission time of the LED 63B and the BL-LED of the light emitting element 63R, as well as the magnitude of the electric current to be applied to the LED 63B and the BL-LED of the light emitting element 63R. The controller 101 also executes similar processing for the light emitting element 63G.

As a result, the levels of the blue components included in the image signals $V_R$, $V_G$, and $V_B$ output from the line sensor 28 become equal to one another. Accordingly, just by subtracting the image signal $V_B$ from the image signals $V_R$ and $V_G$, the controller 101 can remove the blue components from the image signals $V_R$ and $V_G$.

In the example described above, the blue plate 24A is provided in the reading apparatus 100. Alternatively, instead of providing the blue plate 24A, a paint for reflecting blue light may be applied to a portion of a white plate 23. The paint reflects more blue light having a wavelength of 450 nm to 495 nm than other colors of light. Preferably, the paint reflects blue light only.

The following describes more concrete correction processing. When the controller 101 receives an instruction to read a sheet, the controller 101 moves the line sensor 28 below the paint. The controller 101 controls the light emissions of the LED 63B and the BL-LED of the light emitting element 63R such that the level of the image signal $V_B$ and the level of the image signal $V_R$ become equal to each other. The image signal $V_B$ is output from the line sensor 28 which has received the blue light emitted from the LED 63B and reflected off the paint. The image signal $V_R$ is output from the line sensor 28 which has received the light emitted from the light emitting element 63R and reflected off the paint. The controller 101 also executes similar processing for the light emitting element 63G.

[Summary]

As described above, the reading apparatus 100 according to the present embodiment includes the LED 63B that emits blue light and the light emitting elements 63R and 63G. The light emitting element 63R includes the BL-LED and the red phosphor. The BL-LED emits blue light. The red phosphor is excited by the blue light emitted from the BL-LED. The light emitting element 63G includes the BL-LED and the green phosphor. The BL-LED emits blue light. The green phosphor is excited by the blue light emitted from the BL-LED.

The controller 101 of the reading apparatus 100 causes the light emitting elements 63R and 63G and the LED 63B to emit light in an arbitrary order. The line sensor 28 receives the light emitted from the LED 63B and reflected off a sheet. The line sensor 28 then generates an image signal $V_B$ representing blue components of the sheet. The line sensor 28 receives the light emitted from the light emitting element 63R and reflected off the sheet. The line sensor 28 then generates an image signal $V_R$ representing red components of the sheet. The line sensor 28 receives the light emitted from the light emitting element 63G and reflected off the sheet. The line sensor 28 then generates an image signal $V_G$ representing green components of the sheet.

The controller 101 outputs a differential signal $V_R$ obtained by subtracting the image signal $V_B$ from the image signal $V_R$. The controller 101 outputs a differential signal $V_G$ obtained by subtracting the image signal $V_B$ from the image signal $V_G$. The controller 101 generates a color image by combining the image signal $V_B$ and the differential signals $V_R$ and $V_G$.

By performing the processing above, the reading apparatus 100 can remove the blue components, i.e., the image signal $V_B$, from the image signals $V_R$ and $V_G$. Therefore, the color reproducibility of the sheet that has been read can be improved. In addition, the spectrum of light emitted from a phosphor is distributed more widely than the spectrum of light emitted from an LED. By generating an image from the light of the phosphor, therefore, the color reproducibility is more improved. Furthermore, the line sensor 28 included in the reading apparatus 100 is of an inexpensive type that is not provided with a color filter. Therefore, the cost of the reading apparatus 100 can be reduced. Furthermore, there can be just one line sensor 28 included in the reading apparatus 100. Therefore, the cost for the line sensor 28 can be reduced.

According to an embodiment of the present invention, in one aspect, a sheet can be read with high accuracy using an inexpensive line sensor.

Although the present invention has been described and illustrated in detail, it is clearly understood that the same is by way of illustrated and example only and is not to be taken by way of limitation, the scope of the present invention being interpreted by terms of the appended claims. All changes which fall within the meaning and scope equivalent to the appended claims are intended to be embraced within the scope of the present invention.

What is claimed is:

1. A reading apparatus that reads a sheet, the reading apparatus comprising:
   a first light emitting diode (LED) configured to emit light with a specific wavelength;
   a light emitting element including a second LED configured to emit light with the specific wavelength and a phosphor configured to be excited by the light emitted from the second LED;
   a line sensor configured to generate a reference signal according to a quantity of received light emitted from the first LED and reflected off the sheet, and also generate an image signal according to a quantity of received light emitted from the light emitting element and reflected off the sheet; and
   a controller configured to generate an image representing the sheet from a differential result obtained by removing a component corresponding to the reference signal from the image signal.

2. The reading apparatus according to claim 1, wherein the first LED and the second LED emit ultraviolet light, the reading apparatus includes the at least three light emitting elements,
   among the at least three light emitting elements, a first light emitting element includes a red phosphor, as the phosphor, configured to emit red light by being excited by the ultraviolet light emitted from the second LED,
   among the at least three light emitting elements, a second light emitting element includes a green phosphor, as the phosphor, configured to emit green light by being excited by the ultraviolet light emitted from the second LED,
   among the at least three light emitting elements, a third light emitting element includes a blue phosphor, as the phosphor, configured to emit blue light by being excited by the ultraviolet light emitted from the second LED, the line sensor generates:
the reference signal according to a quantity of received ultraviolet light emitted from the first LED and reflected off the sheet;
a first image signal as the image signal according to a quantity of received red light emitted from the first light emitting element and reflected off the sheet;
a second image signal as the image signal according to a quantity of received green light emitted from the second light emitting element and reflected off the sheet; and
a third image signal as the image signal according to a quantity of received blue light emitted from the third light emitting element and reflected off the sheet, and
the controller generates the image by combining a differential result obtained by removing a component corresponding to the reference signal from the first image signal, a differential result obtained by removing a component corresponding to the reference signal from the second image signal, and a differential result obtained by removing a component corresponding to the reference signal from the third image signal.

3. The reading apparatus according to claim 2, wherein the controller subtracts the reference signal from the image signal after attenuating the reference signal by a predetermined factor, or amplifying the image signal by a predetermined factor.

4. The reading apparatus according to claim 3, wherein the controller changes an attenuation factor of the reference signal or an amplification factor of the image signal according to at least one of a total light emission time of the first LED up to a present time and a total light emission time of the light emitting element up to a present time.

5. The reading apparatus according to claim 3, further comprising:
a temperature sensor configured to detect an ambient temperature of the first LED or the light emitting element, wherein
the controller changes an attenuation factor of the reference signal or an amplification factor of the image signal.

6. The reading apparatus according to claim 3, further comprising:
a white plate, wherein
the controller controls light emissions of the first LED and the second LED such that a level of a signal to be output by the line sensor receiving light emitted from the first LED and reflected off the white plate and a level of a signal to be output by the line sensor receiving light emitted from the light emitting element and reflected off the white plate become equal to each other.

7. The reading apparatus according to claim 6, wherein
a paint for reflecting ultraviolet light is applied to a portion of the white plate, and
the controller controls light emissions of the first LED and the second LED such that a level of a signal to be output by the line sensor receiving light emitted from the first LED and reflected off the paint and a level of a signal to be output by the line sensor receiving light emitted from the light emitting element and reflected off the paint become equal to each other.

8. The reading apparatus according to claim 3, further comprising:
a reflection plate configured to reflect ultraviolet light, wherein the controller controls light emissions of the first LED and the second LED such that a level of a signal to be output by the line sensor receiving light emitted from the first LED and reflected off the reflection plate and a level of a signal to be output by the line sensor receiving light emitted from the light emitting element and reflected off the reflection plate become equal to each other.

9. The reading apparatus according to claim 1, wherein the first LED and the second LED emit blue light,
the reading apparatus includes the at least two light emitting elements,
among the at least two light emitting elements, a first light emitting element includes a red phosphor, as the phosphor, configured to emit red light by being excited by the blue light emitted from the second LED,
among the at least two light emitting elements, a second light emitting element includes a green phosphor, as the phosphor, configured to emit green light by being excited by the blue light emitted from the second LED,
the line sensor generates:
the reference signal according to a quantity of received blue light emitted from the first LED and reflected off the sheet;
a first image signal as the image signal according to a quantity of received red light emitted from the first light emitting element and reflected off the sheet; and
a second image signal as the image signal according to a quantity of received green light emitted from the second light emitting element and reflected off the sheet, and
the controller generates the image by combining the reference signal, a differential result obtained by removing a component corresponding to the reference signal from the first image signal, and a differential result obtained by removing a component corresponding to the reference signal from the second image signal.

10. The reading apparatus according to claim 9, further comprising:
a reflection plate configured to reflect blue light, wherein
the controller controls light emissions of the first LED and the second LED such that a level of a signal to be output by the line sensor receiving light emitted from the first LED and reflected off the reflection plate and a level of a signal to be output by the line sensor receiving light emitted from the light emitting element and reflected off the reflection plate become equal to each other.

11. A reading method that reads a sheet, the reading method comprising:
causing a first LED to emit light with a specific wavelength;
generating a reference signal according to a quantity of received light emitted from the first LED and reflected off the sheet;
causing a light emitting element to emit light, the light emitting element including a second LED configured to emit light with the specific wavelength and a phosphor configured to be excited by the light emitted from the second LED;
generating an image signal according to a quantity of received light emitted from the light emitting element and reflected off the sheet; and
generating an image representing the sheet from a differential result obtained by removing a component corresponding to the reference signal from the image signal.

12. A non-transitory recording medium storing a computer readable program that reads a sheet, the program causing a computer to execute:
- causing a first LED to emit light with a specific wavelength;
- generating a reference signal according to a quantity of received light emitted from the first LED and reflected off the sheet;
- causing a light emitting element to emit light, the light emitting element including a second LED configured to emit light with the specific wavelength and a phosphor configured to be excited by the light emitted from the second LED;
- generating an image signal according to a quantity of received light emitted from the light emitting element and reflected off the sheet; and
- generating an image representing the sheet from a differential result obtained by removing a component corresponding to the reference signal from the image signal.

13. The reading apparatus according to claim 1, wherein the first LED and the second LED emit ultraviolet light.

14. The reading apparatus according to claim 1, wherein the first LED and the second LED emit blue light.

* * * * *